US010335759B2

(12) United States Patent
Ramler et al.

(10) Patent No.: US 10,335,759 B2
(45) Date of Patent: Jul. 2, 2019

(54) LOADING/UNLOADING OF PARTICULATES TO/FROM MICROCHANNEL REACTORS

(75) Inventors: Jeffrey J. Ramler, Lewis Center, OH (US); Anna Lee Tonkovich, Dulbin, OH (US); Rachid Taha, Dublin, OH (US); Kai Jarosch, Bexley, OH (US); Robert J. Luzenski, Marysville, OH (US); Jeffery D. Slane, Galloway, OH (US); Thomas Hickey, Dublin, OH (US); Sean Fitzgerald, Columbus, OH (US); Harley D. Freeman, Dublin, OH (US); Frederick A. Zenz, Cold Spring, NY (US)

(73) Assignee: Velocys, Inc., Plain City, OH (US)

( * ) Notice: Subject to any disclaimer, the term of this patent is extended or adjusted under 35 U.S.C. 154(b) by 1806 days.

(21) Appl. No.: 12/265,727

(22) Filed: Nov. 5, 2008

(65) Prior Publication Data
US 2009/0252658 A1    Oct. 8, 2009

Related U.S. Application Data

(60) Provisional application No. 60/985,628, filed on Nov. 5, 2007, provisional application No. 61/094,859, filed on Sep. 5, 2008.

(51) Int. Cl.
*B01J 8/20* (2006.01)
*B01J 19/00* (2006.01)

(52) U.S. Cl.
CPC .... *B01J 19/0093* (2013.01); *B01J 2219/0086* (2013.01); *B01J 2219/00788* (2013.01);
(Continued)

(58) Field of Classification Search
CPC ............. B01J 2219/00932; B01J 2219/00891
(Continued)

(56) References Cited

U.S. PATENT DOCUMENTS

| 3,248,856 A | * | 5/1966 | Guillemin | ............... G01N 30/56 95/87 |
| 4,041,591 A | | 8/1977 | Noll et al. | |

(Continued)

FOREIGN PATENT DOCUMENTS

| EP | 0787524 A1 | 8/1997 | |
| WO | WO 02051538 A1 * | 7/2002 | .............. B01J 19/24 |

(Continued)

OTHER PUBLICATIONS

Matsusaka, S.; Urakawa, M.; Masuda, H. "Micro-feeding of fine powder using a capillary tube with ultrasonic vibration," Advanced Powder Technology, 1995, vol. 6, No. 4, pp. 283-293.*

(Continued)

*Primary Examiner* — Bobby Ramdhanie
*Assistant Examiner* — Denise R. Anderson
(74) *Attorney, Agent, or Firm* — Frank Rosenberg

(57) ABSTRACT

The invention providing methods of loading and unloading particulate from microchannels in apparatus that contains multiple microchannels, typically apparatus that is designed to operate with hundreds or thousands of particulate-containing microchannels. Aligning a sonicating head at one end of a set of microchannels provides a particularly effective mode for densifying particulate in microchannels.

20 Claims, 13 Drawing Sheets

(52) U.S. Cl.
CPC ............ *B01J 2219/00822* (2013.01); *B01J 2219/00824* (2013.01); *B01J 2219/00835* (2013.01); *B01J 2219/00867* (2013.01); *B01J 2219/00873* (2013.01); *B01J 2219/00891* (2013.01); *B01J 2219/00932* (2013.01)

(58) Field of Classification Search
USPC .................................................. 422/502
See application file for complete search history.

(56) References Cited

U.S. PATENT DOCUMENTS

| | | | |
|---|---|---|---|
| 5,260,035 | A | 11/1993 | Lochman |
| 6,244,738 | B1 * | 6/2001 | Yasuda ............... B01F 11/0241 366/114 |
| 6,364,457 | B1 * | 4/2002 | Colecchi et al. ............... 347/47 |
| 6,444,150 | B1 * | 9/2002 | Arnold ............................ 264/69 |
| 6,503,298 | B1 * | 1/2003 | Monzyk et al. ................. 95/96 |
| 6,746,496 | B1 * | 6/2004 | Kravitz et al. ............... 48/118.5 |
| 6,923,907 | B2 | 8/2005 | Hobbs et al. |
| 7,029,647 | B2 | 4/2006 | Tonkovich et al. |
| 7,404,936 | B2 | 7/2008 | Mazanec et al. |
| 7,507,274 | B2 | 3/2009 | Tonkovich et al. |
| 7,541,007 | B2 | 6/2009 | Pattekar et al. |
| 7,847,138 | B2 | 12/2010 | Tonkovich et al. |
| 8,025,919 | B2 | 9/2011 | Ha |
| 2002/0114762 | A1 * | 8/2002 | Wang et al. .................. 423/656 |
| 2003/0150806 | A1 * | 8/2003 | Hobbs et al. ................. 210/635 |
| 2004/0066703 | A1 * | 4/2004 | Sparey-Taylor et al. ..... 366/127 |
| 2015/0203766 | A1 | 7/2015 | Boerrigter |

FOREIGN PATENT DOCUMENTS

| WO | WO 2006094190 | A2 * | 9/2006 | ............ B01J 53/04 |
|---|---|---|---|---|
| WO | WO2009126769 | A1 | 4/2014 | |

OTHER PUBLICATIONS

Michaud et al. "SiliaCat TEMPO: An Effective and Useful Oxidizing Catalyst," Organic Process Research & Development 2007, 11, 766-768).*

Branson Immersible Transducers. Publication Date 1994. 2 pages.*
Jia et al. "Ultrasound Propagation in Externally Stressed Granular Media." Physical Review Letters, 1999, vol. 82, 9, pp. 1863-1866.*
Boughtflower et al., Chromatographia, vol. 41, No. 7/8, pp. 398-402, Oct. 1995.*
Neild et al., J. Micromech. Microeng. 16 (2006) 1562-1570.*
Wiklund et al., Royal Soc. of Chem., Lab Chip 6 (2006) 1279-1292.*
Taylor et al., Anal. Chem. 73 (2001) 492-496, 5 pages.*
Resnick et al., "vol. One, Physics," 4th ed., pub. John Wiley & Sons, Inc., New York, 1992, 24 pages.*
U.S. Appl. No. 12/265,727, portion of Office Action dated May 20, 2013, 3 pages.*
Hellemans, "Focus: Probing a Sandpile with Sound," Phys. Rev. Focus 3, 12 (1999).
Official Action Chinese Patent application No. 200880120163.6 dated Jul. 15, 2013, English translation.
Official Action Chinese Patent application No. 200880120163.6 dated Oct. 10, 2012, English translation.
Official Action Chinese Patent application No. 201410468547.4 dated Aug. 5, 2015, English translation.
Official Action EP Application No. 08 848 457.1 dated Dec. 13, 2011.
Kuhne, U. et al. "Dosage of highly disperse powders by ultrasound agitated tube modules." Powder Technology 155 (2005) 117-124.
Liu, Xinhua et al. "Microfluidized beds: Wall effect and operability," Chemical Engineering Journal 137 (2008) 302-307.
Lu, Xuesong et al. "Ultrasound-assisted microfeeding of fine powders" Particuology 6(2008)2-8.
Van Herk, Daniel et al., "Avoiding Segregation during the loading of a catalyst—inert powder mixture in a packed micro-bed" Applied Catalysis A: General 365 (2009) 1120-121.
Al-Dahhan M H et al.: "Reproducible Technique for Packing Laboratory-Scale Trickle Bed Reactors with a Mixture of Catalyst and Fines" Industrial & Engineering Chemistry Research, American Chemical Society, US, vol. 34, No. 3, Mar. 1, 1995—Mar. 1 pp. 741-747.

* cited by examiner

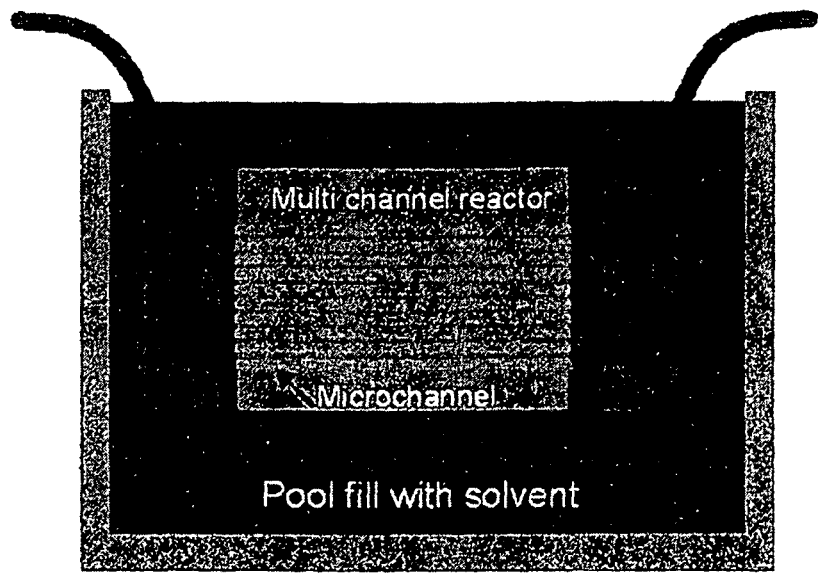
Fig. 4a
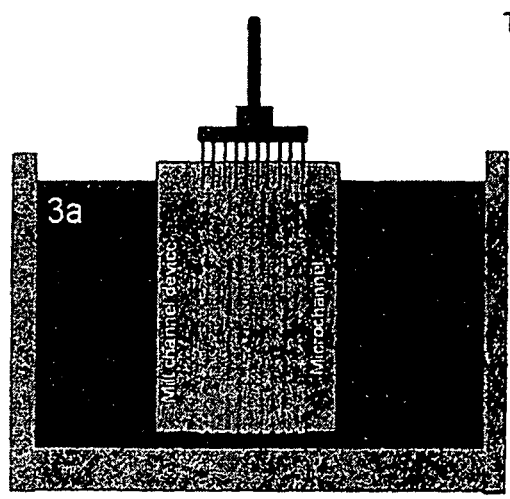 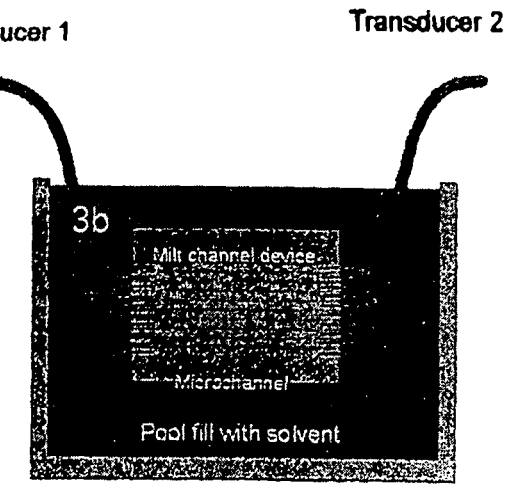
Fig. 4b          Fig. 4c

LOADING/UNLOADING OF PARTICULATES TO/FROM MICROCHANNEL REACTORS

RELATED APPLICATIONS

This application claims the benefit of priority U.S. Provisional Patent Application Ser. No. 60/985,628 filed Nov. 5, 2007 and U.S. Provisional Patent Application Ser. No. 61/094,859 filed Sep. 5, 2008.

GOVERNMENT RIGHTS

This invention was made with government funding under contract W56HZV-07-C-0276. The United States Government has certain rights in the invention.

INTRODUCTION

There are three important aspects for the use of particulate materials (also referred to as powder) in microchannels: charging or loading the particulates materials into the microchannels; quality control and assurance of the loading process; and removal or unloading of particulates from the microchannels.

Amongst the important parameters for particulate material loading into microchannels is the following: 1) the channels are filled evenly, 2) two or more distinct particulate materials may be loaded into each microchannel and each is placed in their desired locations, 3) the packed microchannel reaches its packed apparent bulk density (to avoid additional settling during operation of a unit, or shipment) and that no voids or inclusions are present within the loaded catalyst bed. It is important to achieve a sufficiently uniform bed height and density from channel to channel for a multiple channel device as these parameters effect the pressure drop and fluid maldistribution.

It can be envisioned that a bed could be produced specifically with non-homogenous density or height in order to change or influence the flow distribution but in general the goal is to produce a sufficiently uniform flow distribution, where the flow from channel to channel deviates less than 20% between channels, and less than 10% preferred, and less than 5% most preferred.

It is important to accurately load a catalyst, and or inert particulate in the channels because if significant heat is produced or consumed during the reaction process, then the catalyst needs to be close enough to a heat sink (for example an adjacent channel carrying coolant). In the case of endothermic reactions catalyst needs to be sufficiently close to a heat source in order to maintain the reaction. Inaccuracy in catalyst and/or inert placement can lead to loss of reactor productivity through increased by-product formation or reduced conversion. The goal is to rapidly, accurately and repeatedly load microchannel apparatus that have hundreds or thousands of parallel particulate-containing process channels.

This invention also describes a method of unloading particulate catalysts from microchannels, which enables the reactor hardware re-use for two or more applications. In some embodiments, the reactor may be reused tens or hundreds of times. The reactor may be reused with identical or different catalyst loads at each reload cycle. Ideally the catalyst would not be negatively impacted by normal operational conditions such that at the end of its functionality it would still be a free flowing particle or powder that would exit the reactor under the influence of gravity or gravity in conjunction with other mild physical encouragement. Factors that may lead to difficulties in removal of catalyst include: compaction, sintering, and agglomeration.

The mechanism for compaction is the physical changing of the density of the bed and can be avoided primarily by proper settling of the bed to its packed apparent bulk density. But this condition can be aggravated if the catalyst or inert material experiences physical breakdown. The mechanism for sintering is the thermally induced bonding of adjacent catalyst particles and generally occurs at elevated temperatures. Unless the reaction inherently runs close to temperatures at which sintering may occur it only becomes a problem during an operational upset or during uncontrolled reaction conditions. The mechanism for agglomeration of particles or powders involves the individual particles sticking together with a foreign substance, for example, in the case of Fischer-Tropsch synthesis high molecular weight paraffin wax. Reversal of this process by physical, chemical, thermal or a combination of these is the focus of several of the examples described herein.

SUMMARY OF INVENTION

In one aspect, the invention provides a method of loading particulate into a microchannel chemical reactor or separator, comprising: providing a microchannel apparatus comprising at least 10 microchannels (preferably at least 100, and more preferably at least 1000 microchannels); adding particulate into at least 10 microchannels (preferably at least 100, and more preferably at least 1000 microchannels) in the chemical reactor or separator; and vibrating the reactor containing the particulate such that: pressure drop (for the case of equal pressure at every inlet) for a fluid flowing through a subset of the total number of microchannels varies by 20% or less than the pressure drop for a fluid flowing through all of the microchannels or a different subset of the microchannels for the case of equal flow inlet conditions and equal flow per cross sectional area of microchannels. More preferably within 5% of the average pressure drop, better still within 2% of the average pressure drop. Preferably, catalyst length variations in the microchannels vary by 10% or less of the average, more preferably 5% or less, and still more preferably 2% or less. In this method, a "subset" refers to at least 10 adjacent microchannels (or "at least 100" etc.) in a microchannel array within microchannel apparatus, and in the case of a linear array, 10 consecutive adjacent channels. As an alternative to considering all loaded channels, uniformity can be measured over 90% of channels within a group (or subset) with the 5% of channels on each end of the distribution being discarded. In this method, the "at least 10 microchannels" in the microchannel apparatus does not mean that all microchannels within a chemical reactor are necessarily filled with particulate, but that at least 10 are filled. For example, the reactor or separator might contain 200 microchannels and 20 could be filled. In the invention characterized by pressure drop, pressure drop is measured at a flow rate that is adjusted such that pressure drop averaged over all channels is 20% (for example, if the pressure at the inlet is 10 atm (gauge), then pressure at the outlet is 8 atm (gauge)).

In some preferred embodiments, the "vibrating" is supplied by a sonicator; in some preferred embodiments a sonicating head (also termed sonicating horn) has a face (preferably a rectangular face) that is smaller than a cross-section of the microchannel reactor or separator. In some preferred embodiments, the channels have a waveform. A waveform is a three-dimensional structure that forms a parallel array of microchannels and is placed within a stack prior to joining. In typical embodiments the channels vibrate during the vibrating step. Preferably, there are at least 10 microchannels (preferably at least 100 microchannels) in the apparatus that are within a single linear array of parallel microchannels.

In some embodiments of the invention, a sheet in the form of a wave (i.e., a waveform), that is sandwiched between two metal plates is used to form parallel microchannels.

In one aspect, the invention provides a method of increasing packing density of particulates loaded into a plurality of microchannels in microchannel apparatus, comprising: providing a microchannel apparatus comprising a plurality of microchannels that comprise particulates; positioning a ultrasound-producing head at one end of the plurality of microchannels and placing the head in sonic contact with the plurality of microchannels; and, applying ultrasonic energy to the plurality of microchannels from the ultrasound-producing head. In some preferred embodiments, the invention can be further characterized by one or any combination of the following characteristics: a sonically conductive material is disposed between the ultrasound-producing head and the plurality of microchannels; the ultrasonic energy has a frequency of 20 to 40 kHz; wherein the ultrasound-producing head is pressed against the apparatus with a contact pressure of 200 kPa (30 psi) to 280 kPa (40 psi); wherein the ultrasonic energy is provided in bursts of 30 seconds or less, more preferably from 1 to 10 seconds, and in some embodiments in that range of 1 to 3 seconds; wherein each microchannel in the plurality of microchannels has a length of at least 10 cm and at least one dimension of 2 mm or less; wherein the microchannel apparatus comprises at least 1000 microchannels and wherein the ultrasound-producing head extends over no more than 500 of said at least 1000 microchannels; wherein the microchannel apparatus comprises an insert that extends down the length of the microchannel; wherein the insert transmits sonic energy down the length of the microchannel; wherein the microchannel apparatus comprises channels at least partly defined by walls of a wave-shaped insert (an example of the construction of a waveform is shown in FIG. 9); wherein the microchannel apparatus comprises plural inserts that extend down the length of the plurality of microchannels; wherein the inserts transmit sonic energy down the length of the plurality of microchannels; further comprising a step, that is subsequent to the step of applying ultrasonic energy, of attaching a manifold that covers the ends of the plurality of microchannels and creates a flow path for fluid into or out of the plurality of microchannels. In some preferred embodiments, the microchannel is defined by a first wall and a second wall and the insert has lower mass than either the first or second walls, typically a thickness that is 50% or less than the thickness of either the first or the second walls. Insert can have shapes such as a waveform, or a spiral. The term "extends down the length" means that the insert has a length that is in the same direction as the length of the microchannels. The microchannel length is typically longer than the insert length. In preferred embodiments, the insert's length is at least 50% that of the microchannel, in some embodiments, at least 90% of the microchannel's length.

In another aspect, the invention provides a method of unloading particulates from microchannel apparatus, comprising: providing a microchannel apparatus comprising a plurality of microchannels that comprise particulates; positioning a ultrasound-producing head at one end of the plurality of microchannels and placing the head in sonic contact with the plurality of microchannels; and, applying ultrasonic energy to the plurality of microchannels from the ultrasound-producing head; wherein the step of applying ultrasonic energy is conducted while the plurality of microchannels are dry (note that "dry" means that the channels comprise a greater volume of gas than volume of liquid).

In another aspect, the invention provides a method of loading a chemical reactor, comprising: providing a chemical reactor comprising at least 100 microchannels; adding particulate into at least 100 microchannels in the chemical reactor; and passing a gas through the channels to fluidize the particulate and to move the particulate out of the microchannels, and then decreasing the flow rate of the gas and allowing the particulate to refill the microchannels.

In another aspect, the invention provides a method of loading a chemical reactor, comprising: providing a chemical reactor comprising at least 100 microchannels; adding particulate into at least 10 microchannels in a linear array of microchannels in the chemical reactor; wherein each of the at least 10 microchannels in the linear array of microchannels have a gap (i.e., a channel opening); filling a reservoir with particulate; wherein the reservoir comprises a sliding door that can be moved to form an opening that is substantially rectangular ("substantially" so that it fits over only a single row of microchannels) and that has an opening that is smaller than the gap of the microchannels; moving the sliding door so that the opening of the reservoir matches to the channel openings of the at least 10 microchannels in the linear array of microchannels, and transferring the particulate from the reservoir to the at least 10 microchannels in the linear array of microchannels. In one embodiment, the particulate is transferred from the reservoir to at least 100 microchannels in the linear array of microchannels.

In another aspect, the invention provides a method of removing particulate from an array of at least 10 microchannels containing particulate in a microchannel reactor, comprising: providing a sonicator comprising an array of at least 10 tines; positioning the tines within each of the at least 10 microchannels, and sonicating the particulate in the at least 10 microchannels.

In another aspect, the invention provides a packed bed microchannel chemical reactor or separator comprising at least 100 microchannels loaded with particulate wherein the void fraction (averaged over the at least 100 microchannels loaded with particulate) is 0.50 or less and the pack density of any subset of channels varies by less than 10%, preferably less than 5%, and still more preferably 2% or less.

The invention also includes any of the methods or apparatus described herein. For example, the invention includes any of the methods described herein.

GLOSSARY

As is standard patent terminology, "comprising" means "including" and neither of these terms exclude the presence of additional or plural components. For example, where a device comprises a lamina, a sheet, etc., it should be understood that the inventive device may include multiple laminae, sheets, etc. In alternative embodiments, the term "comprising" can be replaced by the more restrictive phrases "consisting essentially of" or "consisting of."

A "gap" is the smallest dimension of a microchannel. Typically, in a laminated device, the gap is in the stacking direction (i.e., the height). Where the term "gap" is used, preferred embodiments can be described instead as the height of a microchannel.

A "microchannel" is a channel having at least one internal dimension (wall-to-wall, not counting catalyst) of 10 mm or less, preferably 2 mm or less, and greater than 1 μm (preferably greater than 10 µm), and in some embodiments 50 to 500 µm; preferably a microchannel remains within these dimensions for a length of at least 1 cm, preferably at least 20 cm. In some embodiments, in the range of 5 to 100 cm in length, and in some embodiments in the range of 10 to 60 cm. Microchannels are also defined by the presence of at least one inlet that is distinct from at least one outlet. Microchannels are not merely channels through zeolites or mesoporous materials. The length of a microchannel corresponds to the direction of flow through the microchannel. Microchannel height and width are substantially perpendicular to the direction of flow of through the channel. In the case of a laminated device where a microchannel has two major surfaces (for example, surfaces formed by stacked and bonded sheets), the height is the distance from major surface to major surface and width is perpendicular to height. In preferred embodiments of this invention, microchannels are straight or substantially straight—meaning that a straight unobstructed line can be drawn through the microchannel ("unobstructed" means prior to particulate loading). Typically, devices comprise multiple microchannels that share a common header and a common footer. Although some devices have a single header and single footer; a microchannel device can have multiple headers and multiple footers.

"Sonic contact" means that the sonicating head is either in direct contact or the head contacts the apparatus through a solid medium (preferably having a thickness of 0.5 cm or less, more preferably 2 mm or less) that transmits sound.

The volume of a microchannel or manifold is based on open space. Channel walls are not included in the volume calculation.

Particulate refers to particles such as catalyst particles that fit within a microchannel. Preferably, the particles have a size (largest dimension) of 2 mm or less, in some embodiments, 1 mm or less. Particle size can be measured by sieves or microscopy or other appropriate techniques. For relatively larger particles, sieving is used. The particulate may be catalyst, adsorbent, or inert material.

The invention also includes methods of conducting unit operations within the apparatus described herein. "Unit operation" means chemical reaction, vaporization, compression, chemical separation, distillation, condensation, mixing, heating, or cooling. A "unit operation" does not mean merely fluid transport, although transport frequently occurs along with unit operations. In some preferred embodiments, a unit operation is not merely mixing.

Microchannel reactors are characterized by the presence of at least one reaction channel having at least one dimension (wall-to-wall, not counting catalyst) of 1.0 cm or less, preferably 2 mm or less (in some embodiments about 1 mm or less) and greater than 100 nm (preferably greater than 1 µm), and in some embodiments 50 to 500 µm. A channel containing a catalyst is a reaction channel. More generally, a reaction channel is a channel in which a reaction occurs. Microchannel apparatus is similarly characterized, except that a catalyst-containing reaction channel is not required. Both height and width are substantially perpendicular to the direction of flow of reactants through the reactor. Microchannels are also defined by the presence of at least one inlet that is distinct from at least one outlet—microchannels are not merely channels through zeolites or mesoporous materials. The height and/or width of a reaction microchannel is preferably about 2 mm or less, and more preferably 1 mm or less. The length of a reaction channel is typically longer. Preferably, the length of a reaction channel is greater than 1 cm, in some embodiments greater than 50 cm, in some embodiments greater than 20 cm, and in some embodiments in the range of 1 to 100 cm. The sides of a microchannel are defined by reaction channel walls. These walls are preferably made of a hard material such as a ceramic, an iron based alloy such as steel, or a Ni—, Co— or Fe-based superalloy such as monel. The choice of material for the walls of the reaction channel may depend on the reaction for which the reactor is intended. In some embodiments, the reaction chamber walls are comprised of a stainless steel or Inconel® which is durable and has good thermal conductivity. Typically, reaction channel walls are formed of the material that provides the primary structural support for the microchannel apparatus. The microchannel apparatus can be made by known methods, and in some preferred embodiments are made by laminating interleaved plates (also known as "shims"), and preferably where shims designed for reaction channels are interleaved with shims designed for heat exchange. Some microchannel apparatus includes at least 10 layers (or at least 100 layers) laminated in a device, where each of these layers contain at least 10 channels (or at least 100 channels); the device may contain other layers with fewer channels.

Heat exchange fluids may flow through heat transfer microchannels adjacent to process channels (preferably reaction microchannels), and can be gases or liquids and may include steam, liquid metals, or any other known heat exchange fluids—the system can be optimized to have a phase change in the heat exchanger. In some preferred embodiments, multiple heat exchange layers are interleaved with multiple reaction microchannels. For example, at least 10 heat exchangers interleaved with at least 10 reaction microchannels and preferably there are 10 layers of heat exchange microchannel arrays interfaced with at least 10 layers of reaction microchannels. Each of these layers may contain simple, straight channels or channels within a layer may have more complex geometries.

BRIEF DESCRIPTION OF THE DRAWINGS

FIG. 4a-d shows various configurations for wet cleaning of microchannels.

FIG. 9 illustrates a blown up portion of a microchannel reactor showing waveform insert 154.

DETAILED DESCRIPTION OF THE INVENTION

Figure 1A:
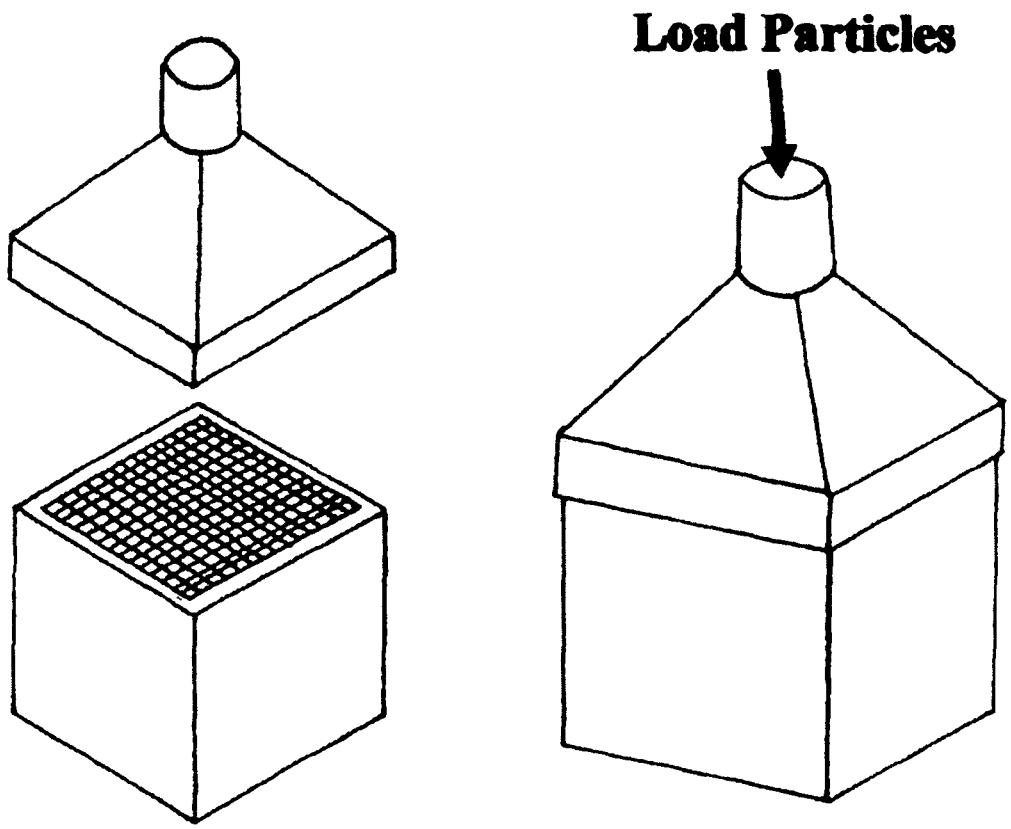
FIG. 1a-e shows fluidization to pack channels.

In the examples and in some preferred embodiments, the range of particle size diameters ranges from 50 microns to 500 microns. The particles are typically loaded into a microchannel reactor that has from 1 to one million channels. A typical range of channels is 10 to ten-thousand parallel microchannels in a device. The microchannel preferably has a dimension that is less than 2 mm and more preferably less than 1.5 mm, and most preferably in a range from 0.5 mm to 1.5 mm. The second dimension of a microchannel that comprises the reactor cross section may be equal to the first dimension or larger. The range of second dimension may range from about 1 mm to 5 cm. The third dimension (length) of a rectangular microchannel preferably ranges from about 1 cm to about 1 m. It is generally understood that a microchannel may have a shape other than rectangular. It may be cylindrical, oblong, or any other three dimensional shape.

EXAMPLE 1.1

Loading Particulate into Microchannels by Channel Dosing

Catalysts loaded into microchannel devices used in microprocessing technology must meet stringent physical and chemical standards to ensure successful operation. Achieving a high level of performance relies not only on the overall quality of the catalyst particulate but the ability to correctly integrate the material into the microchannels of a device while maintaining stringent height and bed uniformity control within a relatively narrow tolerance window.

Measuring channel volume and charging the prerequisite amount of catalyst to the channels is challenged by geometric variability of individual microchannels from the fabrication process used to assemble a reactor. The variation in channel dimensions can negatively affect maintaining sufficiently uniform channel to channel variation in catalyst mass loaded to each individual channel.

In addition, the basic overall flow characteristics of catalyst powders as they are being loaded into a microchannel are governed in part by their skeletal density and the shape of the particles. Particle flow can be affected by a variety of physical characteristics and/or treatment history including:

Moisture content—Catalyst powders, especially those of a hygroscopic nature, can clump or have a greater tendency to agglomerate and inhibit flow. This can result in "bridging" of the catalyst particles across a narrow microchannel, which in turn can lead to voids throughout the catalyst bed.

Electrostatic forces—Dry environmental conditions and materials handling equipment can be prone to electrostatic buildup, especially those constructed of plastic. The presence of static forces disrupts flow by attracting or repelling the powder relative to surfaces it contacts.

Attrition—Excessive handling can abrade the powder via contact with the surfaces of handling equipment, channel walls and friction between individual particles resulting in fines generation that can decrease void fraction and increase $\Delta P$ across the catalyst bed.

Void fraction,—Influences the $\Delta P$ across a densely packed catalyst bed and provides information relative to available surface area where interstitial contact and catalytic activity can occur.

Packed Apparent Bulk Density, PABD—Required for determining mass of catalyst per unit volume.

Particle size distribution also affects material flow and powder density.

Chemical composition—The intrinsic nature of the constituents and additives introduced to reduce clumping or improve slippage also affects powder flow characteristics.

Time at rest.

Particle size of the tested catalyst powder is nominally an average diameter of 300 μm and has little impact on flow performance.

The following experiment was conducted to demonstrate the invention for loading a multiple channel microchannel. The microchannel hardware consisted of 40 parallel microchannels, each was approximately 1 mm by 3 mm in cross section and about 18.7 cm in depth. The reactor contained more than 270 individual microchannels deployed in two rows of equal number of channels. Of the 18.7 cm it was desirable to load 16.8 cm with catalyst such that the top of the catalyst bed in each channel would lie approximately 1.9 cm from the top of the channel. This was done as approximately 1.9 cm of the top portion of the process channels are not adjacent to coolant microchannels running in a cross flow configuration in planes parallel to the process microchannels. This non-coolant adjacent portion of the channels of was loaded with SiC. Heat load at the end of the bed is low and thus the portion of the process microchannel not adjacent to cooling was loaded with FT catalyst.

Total reactor volume was determined by weighting out a known mass of ethanol and then filling the microchannel with ethanol and then re-weighting the aliquot after removal of ethanol to fill the reactor. The mass of ethanol required to fill all the microchannels was found, by difference, to be 119.53 grams. Using a specific gravity of 0.789 the total volume of the reactor to be loaded with catalyst was found to be 151.5 ml. The ethanol was held in the reactor by closing the outlet of the channels with duct tape.

Once the volume of the reactor was determined it was necessary to determine the target mass of catalyst to be loaded into the reactor. This was done by first determining the PABD of the cobalt-silica based catalyst whose particle size distribution, as determined using a Malvern Mastersizer 2000, can be found in FIG. 2. PABD was determined via ASTM D4164-03 (2008) "Standard Test Method for Mechanically Tapped Packing Density of Formed Catalyst and Catalyst Carriers using the alternative method involving a vibrating table". The PABD was found to be 1.08 gram/ml and thus it was targeted to load 147 grams of catalyst.

Before loading catalyst the foot of the reactor was closed by first placing a 120×120 SS304 mesh over a piece of 100 ppi SS304 metal foam (approximately 0.635 cm thick). The foam and mesh were fitted in to a footer that was then affixed to the reactor using bolts and a spring loaded "C" gasket to provide sealing under reactor conditions. The purpose of the foam and mesh were to retain the catalyst in the reactor. Once this was done the targeted load of catalyst, 147 grams, was poured into the microchannels from a beaker. It was found that the 147 grams just filled all of the microchannels to a depth of 18.7 cm. The bed was densified by vibration on a vibrating table and by striking the body of the reactor with a rubber headed mallet. Once catalyst was judged to have settled to the degree achievable with the methods being employed it was found that on average the catalyst bed was 0.25 cm too tall and thus approximately 5.55 grams were remove from individual channels by directing puffs of air into the individual channels using a pipette fitted with a rubber bulb. Individual channel depths were measured by inserting pins in to the channels and determining the depth to which they could be inserted. Once this was done the total catalyst load was approximately 142 grams with a PABD of 1.06 gram/ml. The bed was then topped off with SiC of a similar particle distribution to the catalyst and the top of the reactor sealed in a manner like to that used for the footer.

Determine reactor volume—Accurate volumes can be calculated from the design dimensions or by physically measuring the amount of a liquid that fills the reactor channels (Preferably by using a fluid like ethanol which greatly reduces bubble entrapment and interstitial voids within the liquid filled channels).

Figure 2:
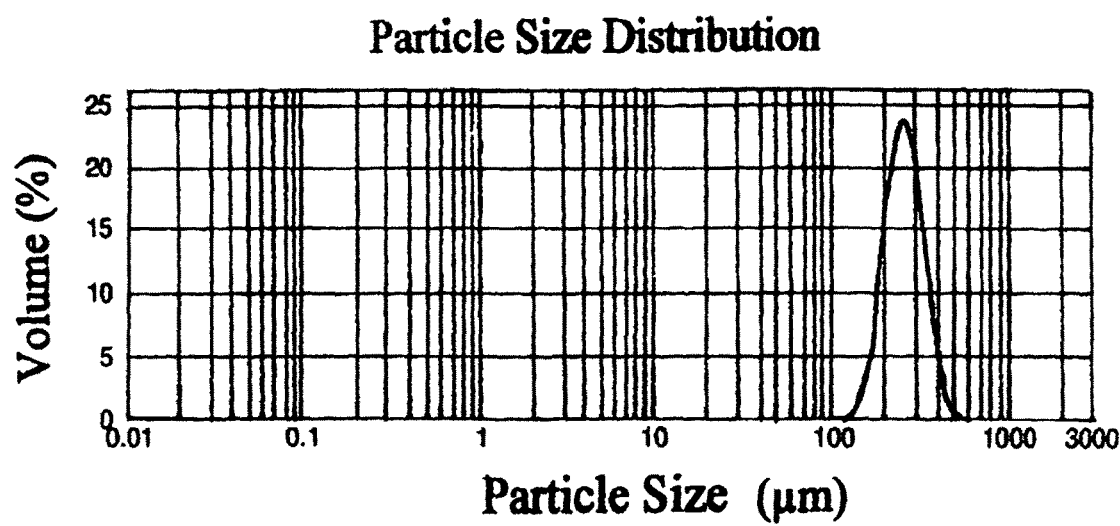
FIG. 2 shows particle size distribution of a tested particulate.

Particulate characteristics include packed apparent bulk density (PABD) and void fraction Void fraction of the packed bed can be determined as follows:

FIG. 2: Nominal particle size distribution for the FT catalyst, Dp,50 is approximately 260 micron The following process proved to be effective at integrating catalyst powder into the waveform channels of test devices with nominal channel dimensions of 1016 micron by 3175 micron (1.02 mm×3.2 mm) and 1016 micron by 5715 micron (1.02 mm×5.7 mm):
1. Add ~30% load by weight
2. Densify bed on vibratory table at 3600 Hz for 30-60 sec. or dry sonicate at 20 kHz (amplitude 1 mm) for 5-10 sec.
3. Repeat two times
4. Top off reactor with catalyst (final 10%)
5. Densify bed on vibratory table at 3600 Hz for 30-60 sec. or dry sonicate at 20 kHz (amplitude 1 mm) for 5-10 sec.

Catalyst Loading Process Equipment for 100 or More Parallel Microchannels:

The type of flow that a particulate material exhibits can be matched with the type of flow that bulk handling equipment will induce upon the material.

Funnel flow—This is particularly suited to course particles, free flowing materials, non-degrading solids and applications where particle segregation is not an issue. In this type of powder flow regime some material is moving while the remainder is stagnant.

Mass flow—Mass flow is good for cohesive solids, fine powders, degradable materials and solids which have a propensity to segregate. In this regime all material is in motion whenever any is discharged.

The catalysts described in the examples have the advantage of particle sphericity, that is estimated to range from 0.7 to 1 as defined by (*Unit Operations of Chemical Engineering*, 4$^{th}$ Edition, McCabe, Smith & Harriot, McGraw-Hill Publishing Company, c1985 pg 137), non clumping characteristics and high attrition resistance. However, its particle size distribution, although relatively narrow, can result in size segregation during handling and loading. Therefore the inherent physical nature of this material makes it well suited to mass flow for transportation and distribution into a grid of closely spaced microchannels.

It is envisioned that a vibratory motion of the feed hopper and distribution funnel will allow efficient and regulated material flow while minimizing superfluous attrition effects. A vibrating table can be employed to settle the material.

Throughout the descriptions, the methods and apparatus can also be characterized by channel packing uniformity or flow uniformity. This uniformity is to be measured over at least 10 adjacent microchannels in a microchannel array within a microchannel reactor, and in the case of a linear array (that is, a series of parallel channels in a plane), 10 consecutive channels, in some embodiments at least 100 adjacent (or consecutive) channels and in some embodiments, all catalyst-containing parallel channels. In every case, uniformity is measured either over all the channels within a group or over 90% of channels within a group with the 5% of channels on each end of the distribution being discarded. Apparatus fulfilling either measurement will meet the requirements of the invention that is characterized by pressure drop at an average pressure drop of 20%. Throughout the descriptions, "channels" preferably refers to microchannels, which are channels that have at least a height or width of 1 cm or less, preferably 2 mm or less, and any length.

Hoppers for delivering powders are known. For example, the Schenck SolidsFlow™ Model 5000 Streamout Feeder delivers a controlled, curtain-like uniform flow across feed tray outlets and is available in widths from 20.3 cm to 167.6 cm.

EXAMPLE 1.2

Loading Particulate into Microchannels Via Fluidization

Figure 1B:
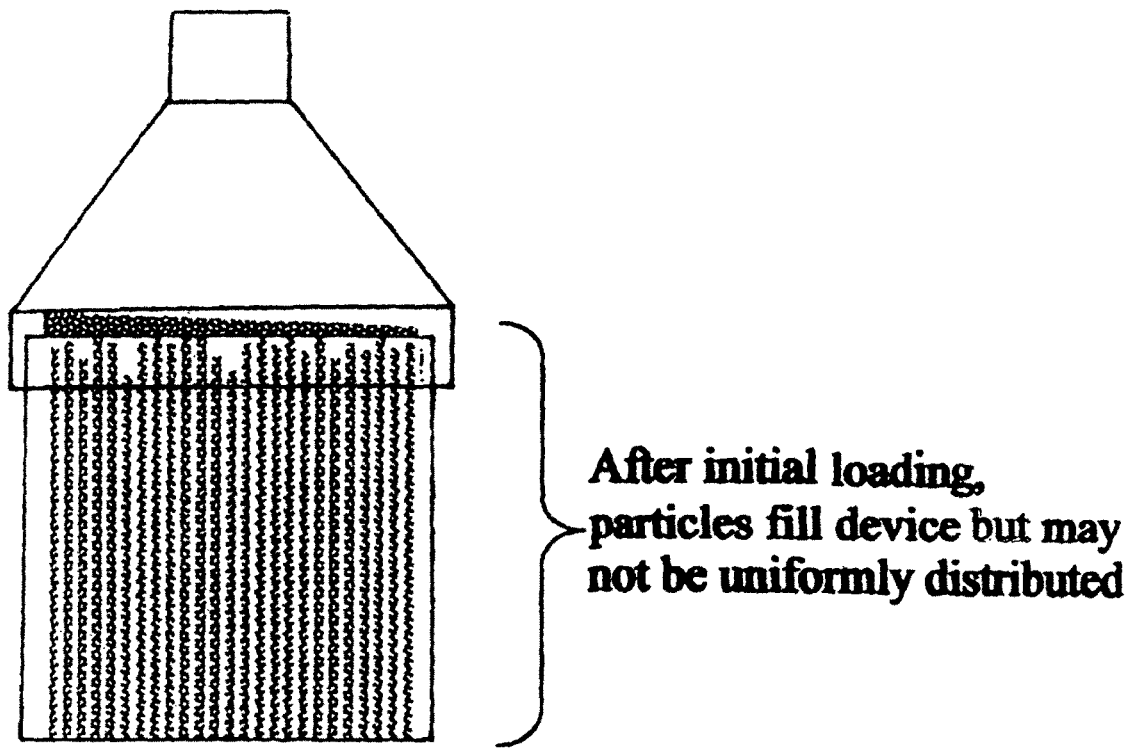
Figure 1C:
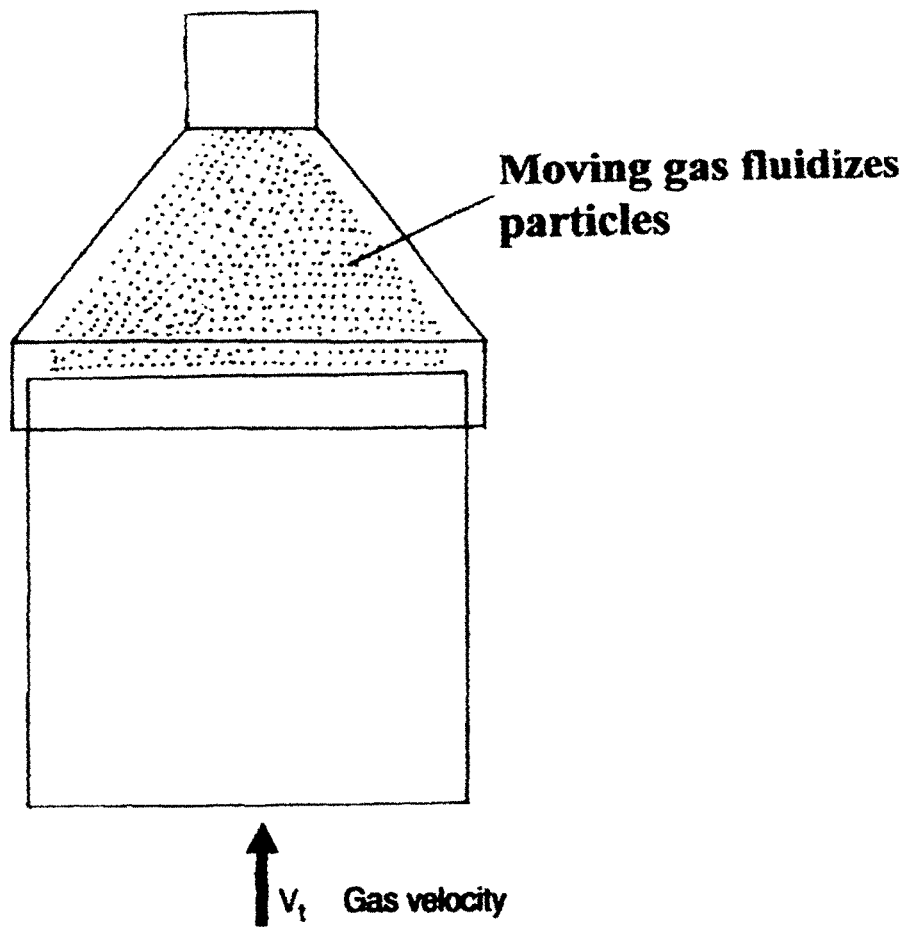
Figure 1D:
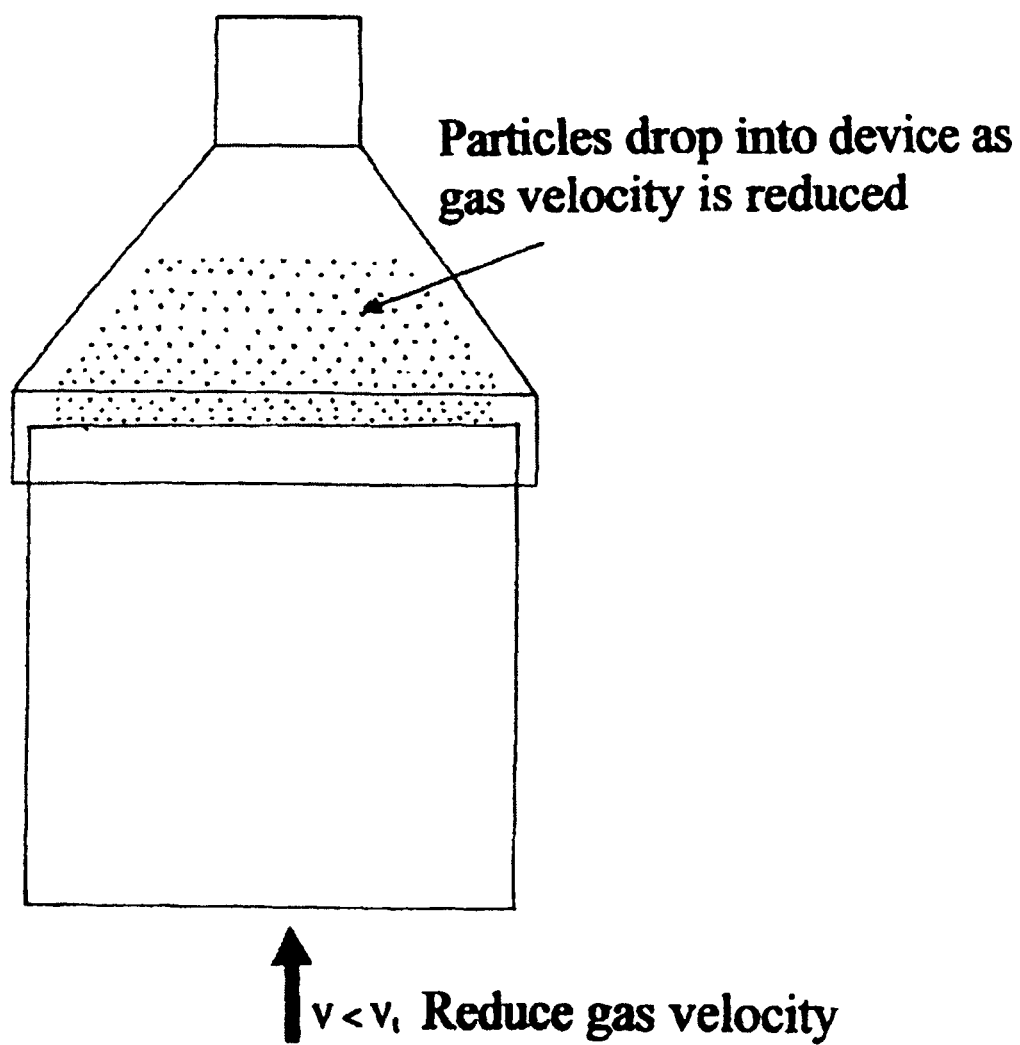
Figure 1E:
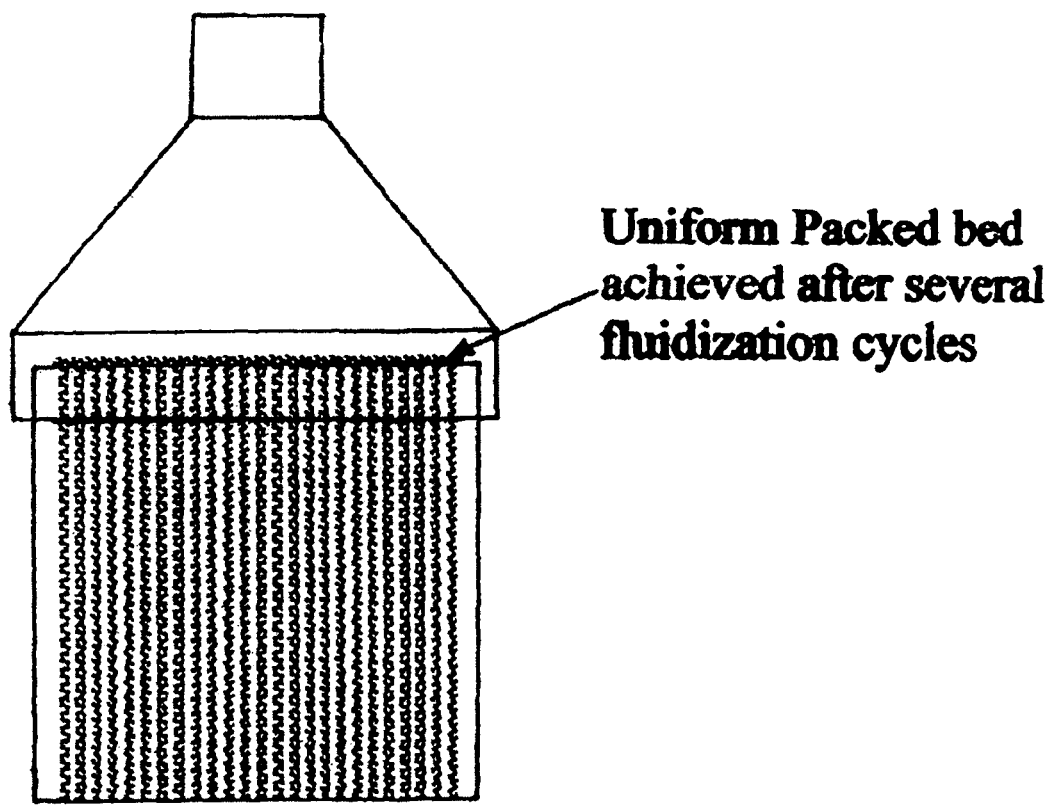

One method for loading a particulate into a microchannel or multichannel reactor is fluidization. Granular particles may be placed in a hopper above a reactor or partially or fully loaded within the channels, as shown in FIG. 1a. The header is designed with enough volume necessary to allow the particles to leave the channels and achieve a fluidized suspension over the channels and not leave out the exit tubing. FIG. 1b shows a potential bed loading using this process. Gas flows upwardly and is adjusted to match the terminal velocity of the particles to fully fluidize all particulates in the hopper or volume above the channels, as shown in FIG. 1c. The gas velocity is reduced to allow the particulates to drop or fall into the channels as shown in FIG. 1d. A secondary step may be used to further redistribute the particles from channel to channel to improve the uniformity by flowing the gas to the point of incipient fluidization to raise the particles such that some of the particles exit the top of the reactor and redistribute. This secondary step assists with redistribution to achieve a sufficiently uniform catalyst packing, as illustrated in FIG. 1e. Sufficient uniformity is defined by no more than a twenty percent flow maldistribution through the packed bed, where less than ten percent is preferred, and more preferably less than five percent maldistribution, still more preferably less than 2%. Maldistribution can be defined by the max flow per channel minus the minimum flow per channel divided by the maximum flow per channel. Alternatively, packing maldistribution can be defined by the maximum length of catalyst in a channel minus the minimum length of catalyst in a channel divided by the maximum length of catalyst in a channel.

The upward flow of gas through all the channels must be sufficiently uniform from channel to channel and can be achieved by creating additional pressure drop at or near the inlet of each channel. The pressure drop through the inlet region is preferably greater than 130% of the pressure drop of the packed bed, as calculated by the Ergun equation. Flow restrictions may take the form of an orifice, a flow distribution feature, a porous media or any other means of adding sufficient pressure drop.

Incipient fluidization occurs when the superficial velocity equals the fluidization velocity ($V_f$) and the particles in a bed will begin to rise.

$$V_f = \frac{(\rho_p - \rho_f)gD_p^2}{150\mu} \frac{\varepsilon^3}{1-\varepsilon}$$

where
$D_p$[m]=Particle diameter in the bed
$\varepsilon$[-]=Void fraction of fluid in the bed g[m/s2]=Gravitational acceleration
μ[kg/m/s]=Viscosity of fluid
$\rho_p$ [kg/m³]=Density of the particle
$\rho_f$ [kg/m³]=Density of the fluid The terminal velocity, $V_t$[m/s] may be calculated as follows:

$$V_t = \sqrt{\frac{2gm_p(\rho_p - \rho_f)}{\rho_p \rho_f A_p C}}$$

Ap [m2/s]=Cross-sectional area of the particle
C [-]=Drag coefficient of particle
$m_p$ [kg]=Mass of particle The terminal velocity is the velocity in the channels, not in the manifold. Drag coefficients are known and can be found in the literature such as Lapple and Shepherd, Ind. Chem. Eng. Chem. 32, 605 (1940).

EXAMPLE 1.3

Loading Particulate into Microchannels Layer by Layer

A mechanism was designed to quickly and efficiently deposit a specific aliquot of catalyst powder into parallel microchannels that are further arranged in repeating rows—to create a two dimensional array of parallel microchannels. The loading device was evaluated in a series of practice trials. Later the device was used to successfully integrate catalyst powder into the waveform channels of microchannel reactor in preparation for reactor operation and performance testing.

Measuring total channel volume and charging the prerequisite amount of catalyst to the channels appears intuitively simple, but geometric variability in the channel dimensions and other procedural variables can lead to irregular channel to channel particle packing densities. The following inventive process deals with filling large numbers of channels in parallel with single aliquots of particles in a time-efficient manner while avoiding individual channel by channel fillings.

Device Design

Figure 3:
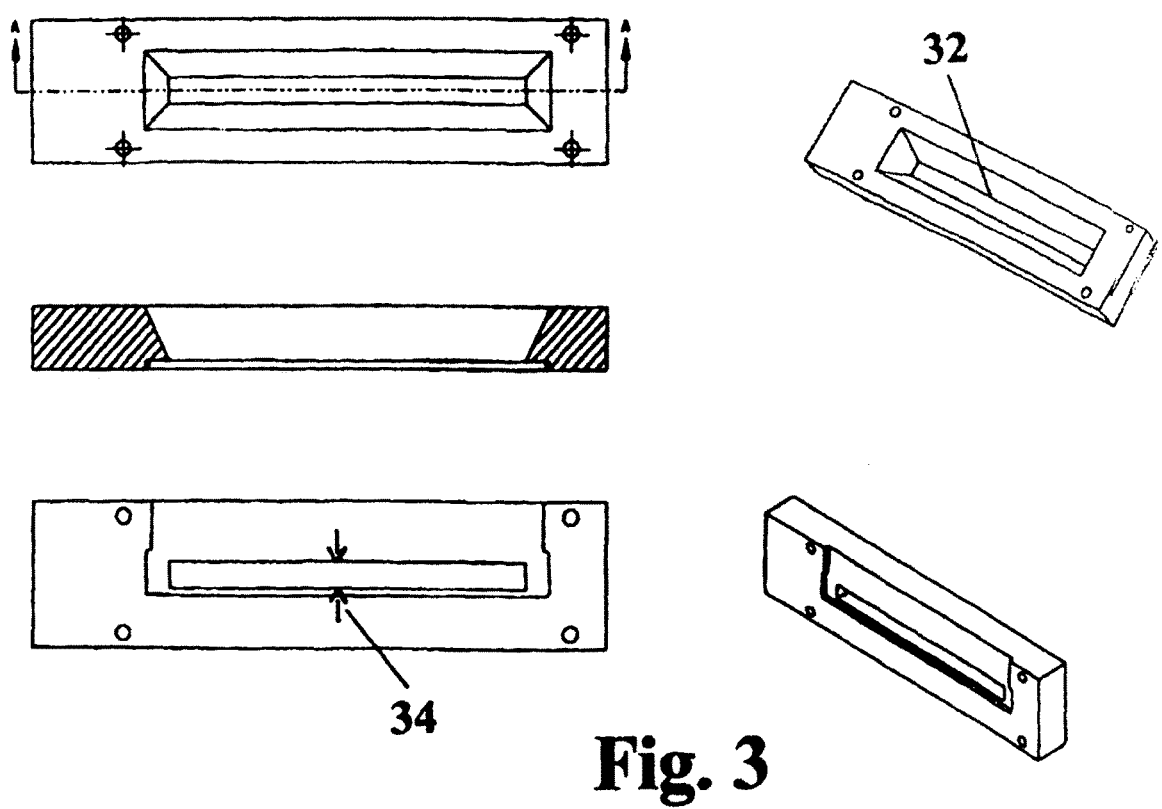
FIG. 3 shows a hopper.

The apparatus consists of a rectangular body, ideally constructed of aluminum or any other dense material, with a centrally located wedge shaped slot 32 (FIG. 3). The size of this wedge slot is designed to match the position, length and width of 1+n rows of microchannels (n is at least 1, preferably at least 5, in some embodiments 5 to 500 microchannels), though not limited to these widths as long as the wedge slot coverage area is larger than the channel openings it is designed to fill. This may serve one or more rows of a microchannel array. This slot may be of other shapes. Installed on the bottom of the apparatus is a "sliding floor" that makes flush contact with the bottoms of the slotted insert reservoirs. In other forms of the inventive process the sliding door 33 can be above an open space between the microchannels and the sliding door.

In addition, there may also be a secondary slot between the sliding door and the microchannel array which has a channel gap 34 of smaller dimensions than the gap of the microchannel array, the direction normal to the width of the microchannel array row, if serving only one row of microchannels in the microchannel array. The gap of the secondary slot is smaller than the microchannel row array so as to force a higher flow resistance to the falling particles from the trap door. This smaller gap makes channeling of particle flow to microchannels in the row with larger cross-sectional areas over those with smaller channel more difficult because of the need to distribute more evenly across the smaller gap as it travels down from the trap door to the microchannel row array. This secondary channel gap is preferably 70% of the microchannel gap, and more preferably 50% of the microchannel gap, and more preferably 30% of the microchannel gap, and more preferably still 10% of the microchannel gap. The length of this smaller gap secondary slot is 25% of the microchannel row array length, and more preferably 50% of the microchannel row array length, and better still 75% of the microchannel row array length and better still 100% of the microchannel row array length or longer.

An optional insert can be installed in the wedge slot to act as a calibrated reservoir. This reservoir insert is actually a series of independent, slotted reservoirs, one for each row of a microchannels array, and is sized to hold a known mass or volume of material when completely filled.

The sliding floor, similar to a trap door, acts as a seal to keep material in the reservoir slots until it is ready to be deposited into the rows of channels. When the sliding floor is quickly opened, the catalyst powder cascades gravitationally into the separate microchannels. Catalyst powder with high flow quality is helpful in maintaining a uniform, regulated flow pattern into all of the channels. The filling process can be accomplished in incremental fractions of the total calculated catalyst load. Alternatively it can be accomplished in a single step depending on the size of the installed slot reservoir. The use of tapping versus mechanical vibration is a function of the size and mass of the device being loaded. The loading of a channel to its full extent is often best accomplished in fractional aliquots, with 50% or less aliquots of the total mass (that is, 50% or less of the particulates are added at one time), and better yet 30% to 33% aliquots of the total mass, and better still 20% to 25% aliquots of the total mass.

The taring of exact mass aliquots into an channel can be done by hand, or can be done using methods developed for the powder handling industry. The powder distribution in the channel can be made more even by the application of a small duration of vibratory motion (to the hopper) prior to opening the trap door, so as to distribute it more evenly across the channel.

Unless the catalyst powder has excellent free flow properties, it is best to integrate the catalyst fractionally. The material can then be densified by tapping or mechanical vibration after each addition to improve bed packing quality and eliminate voids. Depending upon the hardness and packing density of the particulate bed desired the mechanical vibration of the bed may be conducted at a frequency of 3600 Hz for 30 seconds, and better still for 60 seconds and better still 90 seconds. It may be better to wait until all of the channels have been filled with their weight aliquots before the application of vibrational motion, so as to avoid uneven bed compaction caused by the first microchannel arrays filled having seen more vibration.

The following procedure is a proven example for efficiently integrating powder catalyst into a smaller microchannels reactor consisting of a copper waveform bearing 136 channels and sandwiched between two glass plates. The clear construction allowed for visual monitoring of powder flow into the channels and evaluation of fill quality and bed packing characteristics upon densification. This method was also used to successfully load catalyst into 2 adjacent layers (analogous to the one described above) of microchannels in a test reactor.

6. Add ~30% load by weight
7. Tap at least 60 times to densify bed
8. Repeat twice
9. Top off reactor with catalyst (final 10%)
10. Tap at least 60 times to densify bed
11. Remove required amount of catalyst to provide space for backfill of a guard bed
12. Tap at least 30 times to re-densify bed
13. Measure bed depth via pin gauge or dP measurement
14. Adjust any channels that do not meet the ±3 mm height uniformity requirement
15. Add guard bed (e.g. SiC) to top of channels
16. Tap 60 times to densify SiC guard bed

EXAMPLE 1.4

Loading Catalyst into Microchannels Via Bulk Pouring

In cases where the reactor contains linear flow through channels on the process side the catalyst or inert particles can be allowed to flow thought all the channels simultaneously. Once flow of the particles is established the particle retention material, be it a metallic or ceramic foam or wire mesh or other suitable material, can be slid across the outlet trapping catalyst or inert in the channels. Excess particulate material can be removed from the inlet side via scooping, vacuuming or other suitable method.

EXAMPLE 1.5

Loading Inert Material into Microchannels to Provide Zones with No Reaction

In some instances it will be desirable to load specific process microchannels completely with active catalyst (or other active material such as adsorbent) and in others it will not. Reasons for not placing catalyst in particular channels or zones of a channel include the absence of active heat transfer (either to a coolant, to a second reaction taking place in an adjacent plane or from a reaction taking place in an adjacent plane) or the desire to separate process microchannels into zones with different catalysts. In some cases coolant channels may be blocked during the fabrication process and in order to protect the reactor the reactor can be run with inactive material in the process channels corresponding to these locations. In other cases coolant channels may be absent near the inlet and or outlet and inert material can be placed in the corresponding location in the process microchannel to prevent thermal excursions or the formation of hot spots induced by catalytic activity.

The inert material used may be the same material used as the catalyst support, for example silica, alumina, titania, ceria, zeolite, or other suitable catalyst support. In other embodiments the material may be dissimilar from the catalyst support for example diamond or SiC. The particle size distribution of the inert material used can be the same as that of the catalyst or the layer can be graded in size ranging from smaller particle diameters than the catalyst used to larger particle diameters than the catalyst used or vice versa.

Concepts for Unloading Particulate from Microchannels

EXAMPLE 2.1

Hydroblasting was used on an FT reactor that had been run for over 1100 hours of time-on-stream reactor as a means of catalyst removal from the microchannels. An industrial power washer equipped with internal reservoir heating capacity and delivery pressure up to 3000 psig was used. The header and footer of the reactor were removed in order for complete flow of water through the reactor.

The reactor was elevated over a 208 L (55 gallon) drum and immersed vertically half way down into the drum for collection of the water and catalyst. The water was heated internally in the power washer to 93° C. and delivered to the reactor at a pressure of 2758 kPag (400 psig). A pressure gauge was added to the nozzle of the power washer in order to monitor the delivery pressure. The hydroblasting continued until the catalyst stopped flowing from the reactor. At which time, a stainless steel wire (various used thermocouples) was inserted into the microchannels to loosen any residual catalyst. The hydroblasting of the reactor recommenced and the water was collected in the 208 L (55-gallon) drum. Once the flow of catalyst from the reactor diminished, the reactor was rotated 180° vertically. The reactor was hydroblasted in the newly positioned direction. Once the catalyst stopped flowing from the reactor, a stainless steel wire was inserted into the microchannels to aid in dislodging the catalyst. The loose catalyst was removed via hydroblasting. The reactor was agitated with a rubber mallet after the flow of catalyst from the reactor had diminished and hydroblasted once more.

The total amount of catalyst recovered through hydroblasting was 20.4 g of approximately 250 g remaining in the reactor after other removal techniques (primarily gravitational dump) had been attempted.

The nozzle need not be operated manually but could be on a moving carriage or programmable axial positioner. In addition, water alone need not be the only component of the hydroblasting solution but it could include solvents, detergents, particulate or other additives that promote break up of the catalyst. In some embodiments the blasting solution will not contain water.

EXAMPLE 2.2

Use of Vibrating Tables for Catalyst Removal

In some instances particulate catalyst will remain free flowing after operation. In other cases it will require some form of thermal chemical treatment to return it to its free flowing state. Once in a free flowing state catalyst particles can be unloaded by removing either the process header, footer or both and placing the reactor block on top of a catalyst receiving vessel mounted on a vibrating platform. Once mounted the platform or table can be set to vibrate at frequencies between 1 and 10000 Hz with amplitudes between 0.1 mm and 10 cm. Catalyst unloading times will be between 0.1 s and 20 hrs. The table can be programmed to change both frequency and amplitude as a function of catalyst mass or volume recovered and/or time.

EXAMPLE 2.3

Bath and Channel Sonication for the Removal of Spent Catalysts from Microchannels I) Ultrasound Theory and Catalyst Removal Via Ultrasonic Cleaning Ultrasound in aqueous media has shown to be effective technique for the removal of catalyst from the walls of a microchannel or coupon and is directly attributed to the formation and collapse of microscopic bubbles within a liquid. Formation and growth of these "cavitation bubbles"

in the liquid is the result of the oscillatory influence of negative and positive pressures. The negative pressure zone of the oscillating cycle is rarefaction. The positive pressure zone is compression. These zones are generated in the form of traveling sound waves radiating from a vibrating source or transducer.

Cavitation bubbles, after they have formed, will either continue to oscillate for a period of time and ultimately degenerate, or they will grow to an unsustainable size governed by the properties of the liquid matrix and eventually collapses, or implode. The implosion of the bubble cavity releases a shock wave that radiates in a discrete plume from the point of collapse. This implosion phenomenon produces "transient" cavitation. Cavitation bubbles that merely oscillate produce an effect known as "micro-streaming" which only provides agitation within their immediate vicinity. Conversely, implosion of cavitation bubbles produces an intense shock wave that does the work typically associated with ultrasonic cleaning. A challenge has been to bring this type of energy directly inside a large device.

The implosion of a bubble produces shock wave intensity that is directly related to the size of the bubble. Stronger shock waves emanate from bubbles that are larger. The size of the bubble that can be produced is inversely related to frequency. Larger cavitation bubbles are produced at lower frequencies but there are fewer of them. Higher frequencies increase the number of bubbles but decrease their average size. Therefore, if ultrasonic input power remains constant, low frequency input will produce fewer cavitation bubbles but each will contain, and emit, greater energy when they implode. Alternately, higher frequency will produce more bubble implosions each with lower energy. A boundary layer phenomenon also exits where relative motion of a liquid near the surface with which it is in contact is limited due to friction. As such, cavitation bubbles require that the sound waves that produce them have sufficient freedom of motion to allow them to occur. Since higher frequency sound waves do not require as much freedom of motion compared to lower frequencies, higher frequencies can penetrate and produce bubble implosions closer to the surface and within smaller regions. Higher frequencies may be more beneficial in generating energy within a microchannel device where the geometry can be tortuous and the dimensions small.

Ultrasonic transducers with small cross sections are available from the medical industry. For example, Omnisonics Medical Technologies, Inc. manufactures a system for resolving vascular occlusive disease by using ultrasonic energy to create cavitational streaming to break down clots within the blood stream.

A challenge exists in transmitting the ultrasonic power to the clusters entrained in the micro channels reactor. To this end it is necessary to control the ultrasonic wave amplitude, frequency and direction of propagation.

Transducers with variable frequency (15 to 40 KHz) and amplitude (0-±1 mm) are recommended. Transducer design and location on the reactor body are also important in maximizing ultrasonic energy transmission into the channels of the reactor. The following are concepts related to the orientation and design of the transducer.

Figure 4D:
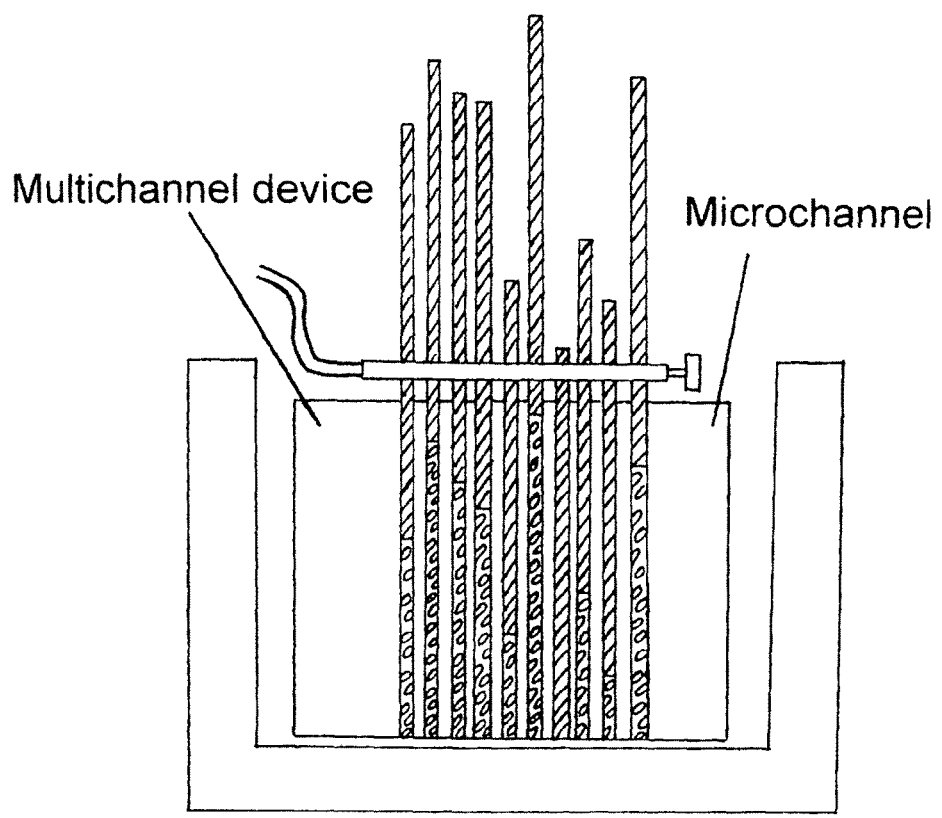
Figure 5:
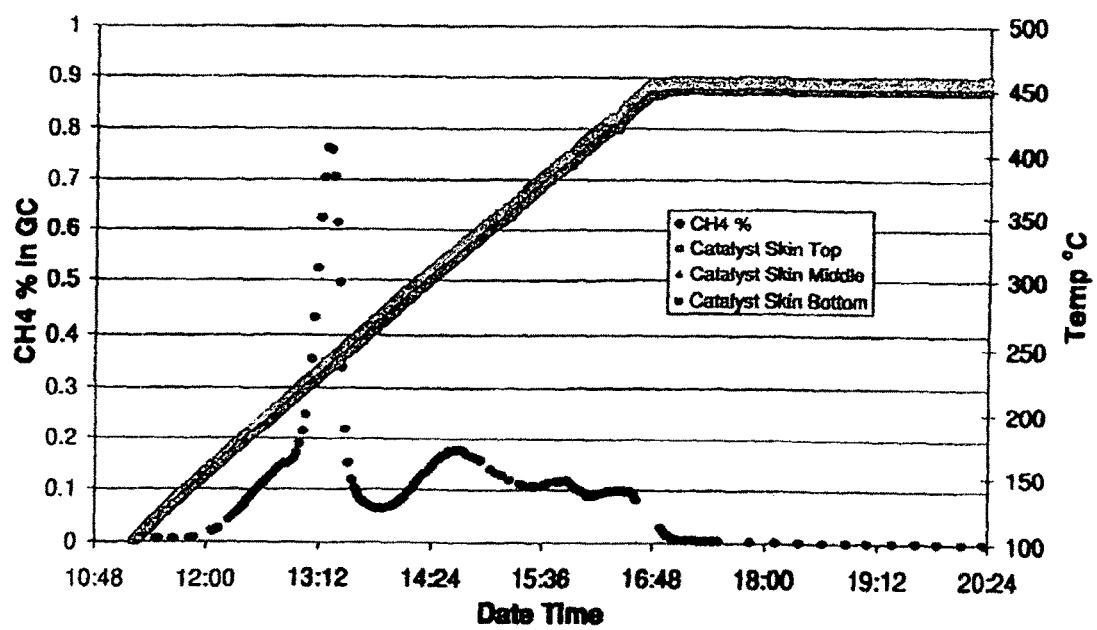
FIG. 5 shows methane evolved during the hydrotreatment of the test reactor. The x-axis is time of day (hour:min).

1-FIG. 4a illustrates one concept: The microchannel reactor is placed in large pool of liquid (e.g. water or any polar or non-polar solvent) and flat transducer plates are placed perpendicularly to the channel axes so that the ultrasonic waves are directed into the channels.
2-To increase the probability of getting the ultrasonic power in the channel(s) the transducer is designed as a fork with several tines that are sized to fit inside the channels. FIG. 4b, c illustrates this approach in two processes:
Only one side of the device is immersed in the solvent and care is taking to fill the channel with the solvent (3a)
The device is completely immersed in the pool containing the appropriate solvent and the ultrasound transmits from both sides into the device through the tines (3b)
FIG. 4d allows direct transmission of ultrasonic power onto the agglomerated cluster. In this approach the tines penetrate varying distances into the microchannels so that the tines directly touch the particulate clusters which minimize ultrasonic power loss to the surrounding environment or solvent medium.
This ultrasonic technique may be used in series with other techniques such as thermal calcination and/or reduction.

EXAMPLE 2.4

Removal of Catalyst Via Solvent Washing

In processes wherein products are condensable under process conditions, catalyst particles and the internal channel walls may become coated during reactor operation. When it is desired to remove or replace the catalyst the coating can act as a binder on the particles, holding them in place. These bound particles do not flow as smoothly as fresh catalyst particles and are more difficult to remove by simple gravity pour or blowing them out of the microchannels with pressurized gas.

Solvents can be used to remove the coating materials from the catalyst particles and the channel walls. These solvents can be flowed through the packed bed as liquids, or in some cases forced through as compressed gases or supercritical phases.

Solvents useful for the catalyst removal process include light hydrocarbons, olefins, aldehydes, ketones, esters, acids, aromatics, or mixtures of these. Supercritical $CO_2$, $NH_3$, amines or steam could also be used. The solvent could be denser than the catalyst, for example by including chlorinated or brominated compounds as components of the solvent.

Preferably, the solvent flows through the packed bed in a direction opposite to the direction of flow of the process stream during operation. In some cases the solvent is heated to near boiling and permitted to condense just before the catalyst bed and flow through the bed while hot.

The reactor can be positioned so that the process flow direction, which is typically a downflow direction, is reversed with respect to gravity during solvent washing. In this case the reactor is turned so that the solvent flows downward through the catalyst bed during washing in a direction opposite to the process flow during operation. Flow patterns that permit the catalyst to be washed out of the reactor during the solvent washing process are preferred.

EXAMPLE 2.5a

Hydrotreating to Promote Catalyst Removal—Small Device Test

A test was undertaken to determine how well a hydrotreating type dewaxing procedure will prepare/loosen used FT catalyst for removal from reactor.

This reactor was run under FT conditions (Inlet pressure 2572 kPag (373 psig), Temperature 220 deg C., hydrogen to CO=2:1, 4% Argon diluent) for approximately 42 hrs. The flow rate of the feed to the reactor was such that the contact time was 177 ms (20,304 hr-1 GHSV) and the WHSV was 5.0. The gap in the process channel is 0.09525 cm. The width of the process microchannel was 0.762 cm.

The device was heated by clam-shell electrical resistance ceramic heaters, and the outlet stream cooled by a tube-in tube heat exchanged with the outer shell running liquid from the chiller.

The test required at least 5000 GHSV, which in the reactor device used here with a packed volume of ~0.2 cc, corresponded to about 17 sccm of flow. In order to accommodate the flows needed for unattended GC analysis, 50 sccm was chosen (~15,000 GHSV) as the inlet H2 flow rate. Assuming this inlet flow rate and a wax loading of ~5% of the catalyst weight (i.e. 5% of 0.2 grams catalyst loaded), and a constant rate of de-waxing), $CH_4$ outlet concentrations and total de-wax times were estimated, as shown in Table 2.5.1 below.

TABLE 2.5.1

Estimated $CH_4$ outlet concentrations and total de-wax times for device dewaxing.

| % of mass methanated per minute | time to complete dewax | outlet $CH_4$ concentration |
|---|---|---|
| 1% | 1.7 hr | 0.32% |
| 0.5% | 3.3 hr | 0.16% |
| 0.1% | 16.7 hr | 0.03% |
| 0.05% | 33.3 hr | 0.016% |

The following steps were undertaken during testing:
1. Run initial cold flow test at ambient T and P
   a. Note during test reactor dP is so low that this cannot be measured with available equipment during testing at high pressure
2. Purge with inert, then pressurize and feed neat H2
3. Slowly heat (1° C. per minute) the reactor
4. Dewax at 1924 kPag (279 psig), 450-460° C. maximum temperature
   a. Track every 15 min. the methane given off during heat up (7 hr) and during dewaxing (overnight, ~15 hr)
   b. Hold at 450° C. maximum temperature until methane tapers off (or after 15 hr) after 3.5 hours at 450° C., no more methane could be detected in the outlet stream, but the device was held overnight at 450° C. (15 hours).
5. Cool and shutdown the device (reverse of startup, but cool at 3° C. per minute).

The conditions used during dewaxing of the reactor device are shown in Table 2.

TABLE 2

Conditions used during the dewaxing of the Reactor device.

| Component | Units | Inlet #1 | Outlet #1 |
|---|---|---|---|
| Flowrate | (sccm, gas) | 50 | 50 |
| Temperature | (° C.) | 450 max | 450 max |
| Pressure | (psig) | 279 | 279 |
| Heat-up rate | (° C./min) | 1 | 1 |
| Cool-down rate | (° C./min) | 3 | 3 |
| Composition | | | |
| % $CH_4$ | (mol %) | | <1 |
| % $H_2$ | (mol %) | 100 | >99 |
| % $N_2$ | (mol %) | purge | purge |

The result of this test was that the majority of the catalyst flowed from the reactor via gravity alone with the balance being removed via gentle tapping. The pressures used in such a technique described above could range from 689 Paa (0.1 psia) to 6895 kPaa (1000 psia). Maximum temperature could be in the range of 150° C. to 650° C. and heating rates could be in the range of 0.01° C./min to 10 deg C./min and more preferably in the range of 0.1° C./min to 5° C./min and in another embodiment in the range of 0.5° C. per min to 2° C./min.

EXAMPLE 2.5b

Hydrotreating to Promote Catalyst Removal—Large Device Test

A microchannel reactor was loaded with 313.5 g of 30 wt % cobalt 5 wt % Re on alumina Fischer-Tropsch catalyst and 177.1 g of SiC inert. The microchannel reactor operated in the cross-flow mode with partial boiling water as the coolant and was of the step-type having 2 rows of twenty inlet process microchannels in parallel planes (separated by a layer containing coolant channels). Each inlet microchannel had a gap of 0.1016 cm (0.040") and was 1.364 cm (0.537") wide and was approximately 29.5 cm (11.6") long in the process flow direction. At the 29.5 cm (11.6") mark the coolant channels cease and the inlet process channels join to form one channel larger channel with a gap of 0.3010 cm (0.122") (formed by a stainless steel wave form) and a length of 29.5 cm 11.6". SiC was loaded into the process microchannel at the inlet and outlet and above and below the location at which the coolant channels ceased (the step).

The catalyst was activated via a procedure involving 3 reduction and 2 oxidation steps and then employed for the Fischer-Tropsch synthesis for approximately 1100 hours time-on-stream under variety of typical Fischer-Tropsch conditions of temperature and pressure. At the end of the operation it was desired to both dewax the catalyst to aid in removal and to re-oxidized the catalyst due to its pyrophoric nature.

The process, or catalyst containing, side was then pressurized to 2651 kpag (348.5 psig) with nitrogen flowing at a rate of 10 SLPM. Once at pressure nitrogen flowing at 10 SLPM was replace with 100% hydrogen flowing at a rate of 10 SLPM. Once hydrogen flow had been established temperature of the reactor was raised to 220° C. from room temperature at a rate of 1° C./min using electrical heaters affixed to the body of the reactor. The reactor was held at 220° C. for approximately 12 hours at the end of which time hydrogen flowing at 10 SLPM was replaced with nitrogen flowing at 5.4 SLPM. Once nitrogen flow was established the reactor was depressurized and the reactor allowed to cool to ambient temperature. The entire system was allow to purge under nitrogen for 48 hours this time being required to purge the downstream equipment as well as the reactor itself.

After applying the dewaxing treatment the catalyst was re-oxidized to mitigate its pyrophoricity. Oxidation was done by first reducing the nitrogen flow to 975 sccm and then addition an 25 sccm aliquot of process air to the flowing nitrogen (for at total flow rate of 1000 sccm). A period of 10 minutes was allow to elapse then a second 25 sccm aliquot of process air was added and the N2 flow was reduced to 925 sccm (for a total flow of 975 sccm). Once this was done 30 minutes were allowed to elapse and after this period samples of gas leaving the reactor were sent to a gas chromatograph for analysis. When the outlet concentration of oxygen had reached 90% of expected value of the inlet concentration, approximately 1.8% (inlet), a further two 25 sccm aliquots of air were added to the using the methodology described above (for at total flow of 100 sccm of process air supplemented by 875 sccm of nitrogen. From this point on the process was repeated using 100 sccm increments of process air and the subsequent removal of 100 sccm of Nitrogen flow to maintain a total flow of 975 sccm. The final increment took the air flow to 95% of the full scale value of the mass flow controller giving a final total flow of process air of 475 sccm. From this point the nitrogen flow was reduced in 100 sccm increments with a pause of 30 minutes between increments until only process air was flowing at a rate of 475 sccm.

Once the flow consisted only of process air the device was heated to an average temperature of approximately 80° C. at a rate of approximately 0.5° C./min. After reaching 80° C. the reactor was held at 80° C. temperature for approximately 4.5 hours and then allowed to cool to ambient temperature.

Once the dewaxing and passivation procedures were completed the reactor was removed from the testing infrastructure and mounted on in a frame in a manner that allowed it to be rotated (thus allowing catalyst to be emptied from either inlet or outlet sides of the reactor). The process header and footer were then removed. With the footer outlet side up the porous stainless steel foam used to retain the catalyst in the microchannels was removed and the reactor rotated to allow catalyst and SiC to flow out under gravity into a stainless steel catch pan (partial filled with water in case of remaining pyrophoricity). This process was repeated for the inlet (header) side of the reactor. Later the reactor was tapped, on the sides and top, with rubber mallets and subsequently with metal headed hammers to encourage flow of catalyst (~1Hz tapping). The rubber headed mallets produced little result. In addition to tapping the assembly was vibrated using a hopper vibrator. Finally 0.1016 cm (0.040") diameter aircraft drills were used to scrape and drill at recalcitrant catalyst. Of the above methods only the gravity flow and metal headed hammers had any significant effect. The vast majority of the catalyst flowing from the device came either purely by the effect of gravity or gravity combined with low frequency blows with a metal headed hammer (in which case the catalyst would flow would start under the hammer blows and continue after the blows ceased). In this manner approximately 241 g of material were recovered (approximate 49% of the total mass initially loaded).

Subsequent to these treatments the reactor above was subjected to hydroblasting as described in Section 2.1. In addition and subsequent to the hydroblasting the reactor was filled with hexane and allowed to sit for several hours. This procedure was repeated twice and after the reactor allowed to dry over a period of approximately 48 hours the reactor was agitated with the metal headed hammer. This treatment produced an addition 3.7 g of material recovery.

EXAMPLE 2.6

Coke Removal by Steam Oxidation

When hydrocarbon synthesis reactions are catalyzed by acidic species or operated at high conversion, formation of coke on the surface is a common phenomenon that reduces catalyst activity. The coke will tend to bind adjacent catalyst particles, leading to creation of agglomerates that are difficult to remove from a reactor when it is desired to regenerate or replace the catalyst. High molecular weight hydrocarbons can accumulate on the catalyst surface during normal process operation, forming a wax that will bind particles together. Either mechanism of particle agglomeration can be particularly troublesome when the catalytic reactor has microchannel dimensions.

Typically an oxidizing environment is desired to convert coke to volatile compounds that can be swept away from the catalyst surface. Steam is a simple and inexpensive oxidizing medium. Steam is also a convenient source of heat for melting and/or volatilizing heavy hydrocarbons. The literature teaches that care must be exercised when steam is applied to certain catalyst species, especially when the hydrocarbon synthesis reaction involves Fischer-Tropsch chemistry.

To avoid high temperatures which could promote excessive oxidation of the catalytic species, steam can be passed over the agglomerated catalyst to be unloaded at a pressure that is lower than the normal operating pressure. The lower pressure will also facilitate volatilization of undesired hydrocarbons when wax is also present. Since steam is a vapor, no special reactor configuration is required as, for example, would be the case if one were to employ liquid solvents to remove wax. However, for a specific reactor and catalyst system, it may be more beneficial to feed the steam in a direction countercurrent to the direction of flow during normal operation.

Saturated steam in the range of 120 deg C. to 400 deg C. with vapor fractions of 0.0 to 1 may be used. In a second embodiment superheated steam may be used in the temperature range of 120 deg C. to 600 deg C. Steam may be mixed with other oxidizing compounds such as hydrogen peroxide, air or pure oxygen in any conceivable ratio.

EXAMPLE 2.7

Unloading Via Fluidization

A means of unloading the catalyst may be to apply the terminal velocity of gas to the bed, described in the previous section for the fluidizing loading process. Taking the system in FIG. 1c and orienting the flow in the direction of gravity to give the fluid additional gravitational acceleration would be helpful.

Section 3: Concepts for Quality Control of the Loading of Catalyst or Inert Materials into Microchannels

EXAMPLE 3.1

Quality Assurance Via Pressure Drop Measurement

Another measure of the quality of equal packing density of microchannels with powder is the flow resistance each channel delivers to flow. For channels with equal packing density should have very similar pressure drop, predicted by the Ergun equation for flow through a packed bed $$\Delta P = \frac{150\mu U \Delta L}{(\phi D_p)^2} \frac{(1-\varepsilon)^2}{\varepsilon^2} + \frac{1.75 \rho U^2 \Delta L}{\phi D_p} \frac{1-\varepsilon}{\varepsilon^3}$$

where we define
$D_p$[m]=Particle diameter
$\varepsilon$[-]=Void (open) fraction for fluid flow
$\phi$[-]=Sphericity of the particle
$\Delta L$ [m]=Length of the bed
$\mu$[kg/m/s]=Viscosity of fluid ΔP [Pa]=Pressure drop across the particle bed
ρ[kg/m3]=Density of the fluid
U[m/s]=Specific velocity for the channel The first and second parts are for viscous and inertial losses. The pressure drop for the packed bed should be the same for microchannels of the same length should the particle size ($\phi D_p$) and packing density (ε) are the same. On this basis the pressure drop for a set flow rate can be used to compare catalyst packing from channel to channel.

The application of flow over one or more channels can be used to ascertain the particle packing. The challenge is to attach the fluid source to the device so a hermetic seal against the channels can be made. This can be difficult for some channels due to size and shape of the opening make putting a tube or other connection onto one or more channels. One means to accomplish this is in using a small hole on the order of the microchannel cross-section through a gasket material, adhering said material to a tube or tubing connection and compressing to the surface with external force. The connection can be applied to every microchannel in the array or for a representative sample (for example, 10 or 100 adjacent microchannels, such as 10 consecutive channels in a linear array of parallel channels). Other means of attaching a connection temporarily to the surface is apparent to those familiar to the art.

If the channels are made from thin material it may be beneficial to make a hermetic seal without large amounts of external pressure. It is thus advantageous to have a smaller channel pressure drop such that the Ergun equation gets only 10% or less of its pressure drop from the inertial term.

The packing is well distributed if the pressure drops (for the case of equal pressure at every inlet) vary by 10% or less of the average, better still if within 5% of the average, better still if within 2% of the average. The same levels are preferred for catalyst length variations. As mentioned above, these measurements are based on at least 10 adjacent microchannels and 10% of the largest variants (5% from each side of the distribution) from each set are not included in the measurement.

EXAMPLE 3.2

Load Level Assurance Via Pin Measurement

Figure 6:
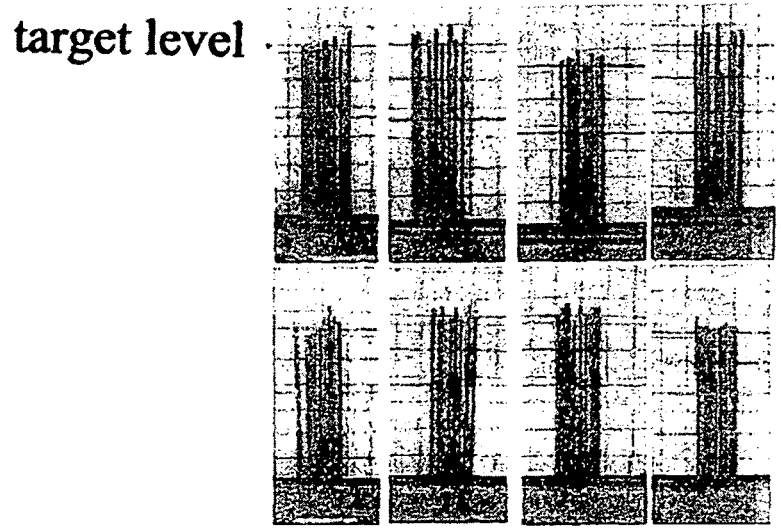
FIG. 6 is an example of using calibrated pins to determine load height.

A direct method for the determination of the height of particles loaded into microchannels is via the use of pins of known length to locate the top of the particle bed. This is illustrated in FIG. 6 in which pins of uniform length are inserted into 2 layers of microchannels loaded with both catalyst and inert particulate. In this specific case the microchannels have a nominal gap of 0.09525 cm (0.0375") and a nominal width of 0.3023 cm (0.119"). When it was judged enough catalyst and inert had been loaded to bring the bed close to the desired axial location in the channel the pins were inserted and compared to calibrated background—in this manner the actual loading level in each channel could be determined and the final loading adjusted to produce the desire axial level and degree of uniformity.

In the above example the method was applied manually and only near the end of the loading process. In other embodiments the all channels in a given layer or in multiple layers can be assessed simultaneously using arrays of pins and the levels recorded via automatic methods (optical or otherwise). By employing longer pins measurements can be made throughout the loading process (from a bed height of zero to full). The form of the feeler gauge need not be pins but could be of any suitable shape such as ribbons or strips with dimensions suitable for insertion in microchannels from 1 to 1000 micron in gap. If individual microchannels are wide enough multiple pins or feeler gauges can be used to produce a profile of the top of the particle bed in any given channel.

EXAMPLE 3.3

Concept for Using X-Ray Inspection to Determine the Height of a Catalyst Bed Loading in a Microchannel Various methods of imaging may be used to determine the height of a catalyst bed in a microchannel device when there is no accessibility for direct measurement. The microchannel device is usually composed of metal plates separated by ribs to create open channels into which the catalyst is installed.

The simplest method is to use an x-ray source with photographic paper or detectors, similar to the method used to inspect welds on piping and pressure vessels. The limitation to this method would be in achieving adequate resolution through a thick device which has many layers of microchannels.

Another technique is to use an x-ray CT (computerized tomography) scan through the device. A slice is scanned through the device, then the scan is moved in the direction of catalyst height and another layer is scanned. By repeating this process, a 3D image of the interior of the device can be generated, showing the locations at which the catalyst stops and the channels become open. An example piece with a 5.08 cm by 10.16 cm cross section can be scanned using a 450 kV source. Thicker devices may require higher powered sources depending on the resolution required.

Microchannel devices often have thick metal plates on the outside of the device due to the stress created by internal pressure in the channels. The thick metal plates require a large amount of power to penetrate with x-rays or other methods.

Small pockets can be machined into these end plates at the required height of the catalyst beds. These pockets would reduce the metal thickness at the measuring location, allowing the use of lower power sources while maintaining the required resolution.

Other methods which could provide measurements of the catalyst bed heights are: MRI (magnetic resonance imaging), ultrasonic Inspection, and fluoroscopic imaging.

EXAMPLE 3.4

Load Level and Packed Density Assurance Via Sonographic Inspection

The level and density particulate beds loaded into microchannels can be assessed by the use of transmitted sound waves be they in the range of infrasound (below approximately 20 Hz), in the range of acoustical sound (approximately 20 Hz to 20 kHz) or ultrasound (frequencies above 20 kHz). Sound broadcast through the device using either multiple fixed or mobile transmitter receiver pairs will be attenuated by the presence of particulate packed in the channels. In a second embodiment one transmitter can be used in conjunction with several receivers with both transmitters and receivers being fixed or mobile. In a third embodiment multiple transmitters can be used with single or multiple receivers all being fixed or mobile. Emissions from transmitters can be continuous or pulsed and in the case of multiple transmitters, broadcasting at different times and or at different frequencies and intensities.

The level of attenuation can be correlated to the density of a specific packing and thus used as a quality control. An abrupt change in intensity will indicate either the top of the particle bed and or the presence of a void space in the bed. Changes in attenuation can also be used to detect the placement and level of different materials for example zones in to which SiC has been loaded instead of catalyst. As the number of parallel planes that are scanned is increased it will be possible to form 3D images and detect voids and density differences deep in the structure. Variation of frequency and intensity of the sound will also provide additional resolution.

EXAMPLE 3.5

Load Level and Packed Density Assurance Via Hot Wire Anemometry

A non-invasive means to determining the packing of a microchannel array is the use of hot wire anemometry [G. Comte-Bellot, "The Handbook of Fluid Dynamics", CRC Press, 1998, Section 34, R. W. Johnson, editor]. Use of a calibrated hot wire anemometer could make obtaining channel-to-channel flow distribution more straightforward with flow to every channel, should a manifold be used for distributing fluid flow to one end of the channels.

The velocity profile from the streams leaving a packed bed will be close to plug flow, so measurement of the gas flow close to the outlet should mirror flow in the channel. The measurement of the hot wire should be made within 0.05" to 0.25" away in the normal direction from the outlet. All or a representative number of channel exit velocities should be measured. The individual and average velocities should be taken. Good distributions should have outlet velocities within +/−20%, and more preferable +/−15%, and more preferably +/−10% and more preferably +/−5%. Good distribution implies uniform packing density to the degree of the uniformity of the distribution.

Ultrasound Loading and Densification Using Dry Ultrasound

To overcome challenges of propagating ultrasound waves through the walls of a microchannel reactor body, the ultrasonic source horn (Ultra Sonic Seal, Model ST, 1500 watt ultrasound power supply (Broomall, Pa.) equipped with a 2.54 cm×20.3 cm titanium horn manufactured by ToolTex, Inc. Grove City, Ohio.) was positioned at the inlet of the vertically oriented channels.

Figure 7:
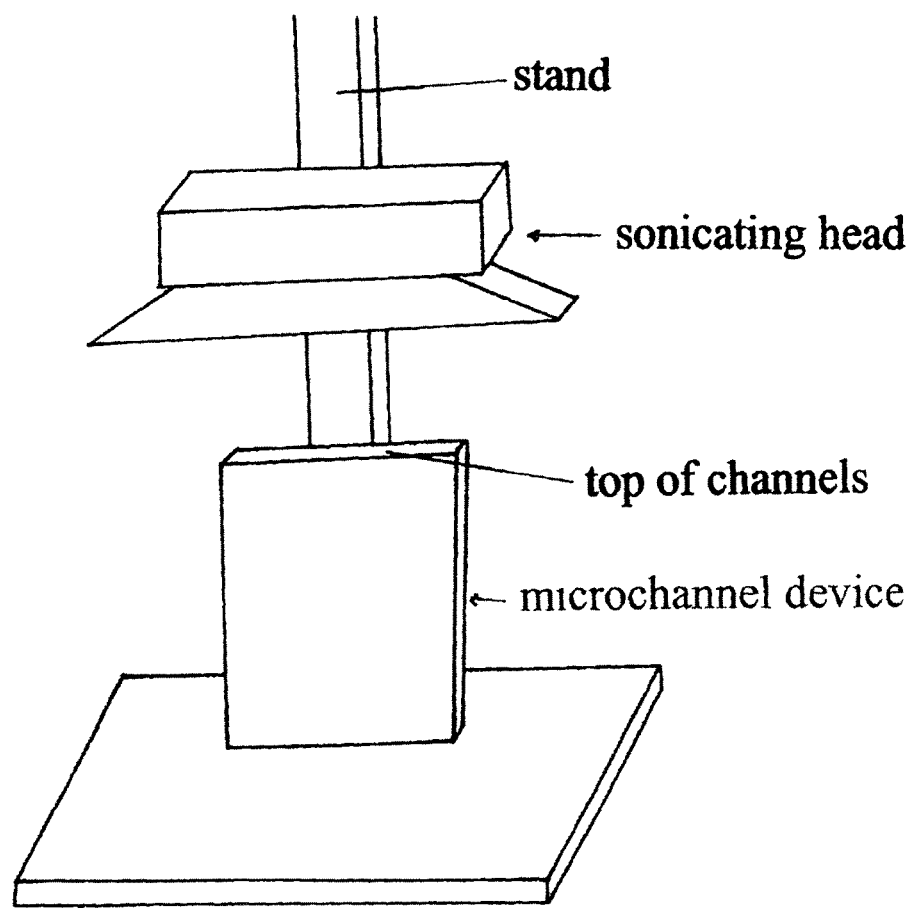
FIG. 7 is an illustration showing orientation of the channel containing segment of the device of Example 3.5 in relation to the ultrasound unit installed on "drill press" stand. A pneumatic control permits homing and position adjustment of the horn assembly in the vertical plane.

It was demonstrated that if the horn is positioned in this manner the waveform channels (that form the microchannels which contain the particulate catalyst) function as a focusing medium for the ultrasonic energy by creating transversal waves that transmit ultrasound vibration through the walls of the channels in a longitudinal direction. This proved effective in transmitting the vibration frequency through the entire length of the microchannels (up to 61 cm in length demonstrated and at least 1 m or more in length expected) channels with minimal attenuation. In this case the ultrasound components consisted of a 1500W supply transformer, an amplitude booster and a tuned titanium ultrasonic horn measuring 20.3 cm long by 2.54 cm wide. The assembly was mounted on a plenum attached to a round steel column, similar in design to a drill press stand (FIG. 7). The position of the ultrasound unit was pneumatically adjustable in the vertical plane along the length of the steel column. The pneumatic control also positioned the horn directly on the top edge of the channels with adjustability of its contact pressure against the surface of the device. Either a metal screen or thin metal plate was placed between the top of the channels and the emitting horn to prevent contact damage to the ends of the waveform channels. It is envisioned that this approach will also work for stainless steel microchannels without using a waveform. It is not believed that that the material of the waveform or microchannel is critical to operation of this method, although metals are preferred.

Ultrasound densification testing was conducted on particulate material packed between a steel and acrylic plate test device. Ultrasound was transmitted through a steel plate or from the top of the device at the apex of the channels. Adjustments were made to burst duration and contact pressure of the horn against the device during these initial trials. Burst duration was typically from 5-20 seconds and the horn was adjusted to a frequency of 20 kHz at amplitude 0.5 mm. Pressure of the horn against the device body was surprisingly found to be an important parameter. If the pressure of the horn was too low it hammered against the contact surface at its input frequency increasing the potential for damage to the face of the horn with little propagation of ultrasound into the device. If the pressure was too high the horn "coupled" with the device and sonic energy was mitigated, diminishing the efficiency of the process.

Densification was more than ten times faster and beyond that which was achieved through mechanical means. For example, a 61 cm long waveform was filled with particles with an average diameter of 300 µm support material and densified by striking the device body with a rubber mallet ~400 times over a 10 minute period until perceived maximum densification was achieved. Introduction of ultrasound through the tops of the channels for a period of only 5 seconds settled the powder bed another inch. Fill level uniformity across all channels also improved compared to mechanical vibration. In this case the contact pressure of the horn against the channels was 25 psi. In a demonstration of excessive energy input the contact pressure was increased to 45 psi and the powder within the channels was disrupted through fluidization resulting in inconsistent density and poor fill level uniformity.

Catalyst Unloading Using Dry Ultrasound
Fischer Tropsch Reactor Unloading

Figure 8:
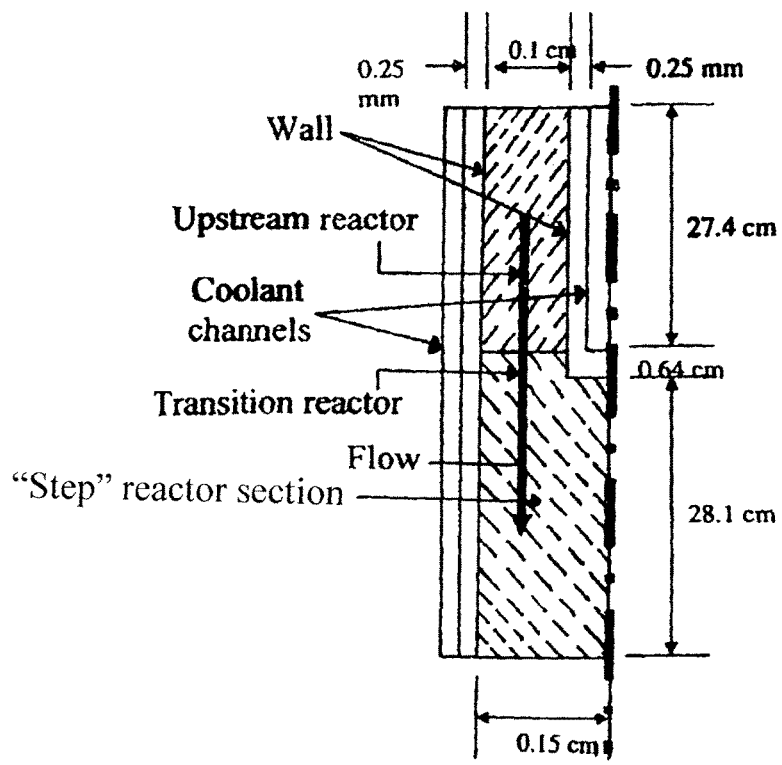
FIG. 8 is an illustration of the microchannel FT reactor's repeating unit dimensions, not to scale, with internal symmetry as the right hand side's vertical edge.

The cross-sectional dimensions of the process channel are shown (not to scale) in FIG. 8. The figure shows the main repeating unit, with the vertical symmetry line on the right-hand side. The repeating unit is made up of the actual process channel (rock and ceramic textures), the containment walls and the coolant channels aligned perpendicular to process flow extending into and out of the page's plane. The process channel has two separate sections: An upstream section before the "Step" change in cross-sectional area with heat removal on both sides of the channel, and the "Step" reactor section downstream with heat removal on only one side of the channel per side of the symmetry plane.

The upstream sections, one per side of the symmetry axis, have a gap height of 0.1 cm tall and are 28.1 cm long. In this upstream section there is heat removal from both sides by adjacent partial boiling coolant channels, with the exception being the last 0.64 cm of the middle coolant channel array on the side nearest the symmetry line.

The "Step" reactor section downstream is 28.1 cm long and 0.15 cm from the containment wall to the symmetry line. The containment wall, as mentioned earlier, is 0.25 mm thick, except at the end of the upstream section where it is 0.75 mm thick.

The FT reactor was loaded with catalyst by addition of powder from the top, which represents channels of 0.1 cm tall. The heights of loading were measured by a straight piece of wire of known length and a ruler to determine the depth of the bed.

The order of the loading was as follows:
1. Filling the bottom with SiC powder and densify.
2. Filling to below the "Step" with catalyst powder and densify.
3. Filling the region just above and below the step with SiC powder and densify.
4. Filling the reactor channels to within 1.9 cm of the top of the channel with catalyst powder and densify.
5. Fill the rest with SiC powder to the top and densify.

Forty channel sections were loaded by hand and heights measured.

The SiC powder at the top starts at position 0 inches down to 1.95 cm with a standard deviation of 0.3 cm. The catalyst section starts thereafter and extends down to 28.14 cm from the top with a standard deviation of 0.63 cm, and the SiC layer extends in the 0.1 cm tall section to 30.8 cm to the "Step". Below the step in the 0.31 cm tall section with the wave form the SiC layer extends down to 35.3 cm with a standard deviation of 1.31 cm. The bottom of the channel is filled to 55.37 cm with catalyst powder and the last 4.47 cm is filled with SiC powder to get a density of 1.80 gm/cc. The next section is the top catalyst section, 1.36 cm wide by 0.1 cm tall and 26.2 cm long, with a loading of 145.198 grams gives an average packing of 0.97 gm/cc. The next section is "Step" SiC powder layer, with an 2.67 cm above the "Step" and 4.5 cm below it, and with a loading of 76.516 grams has a density of 1.38 gm/cc. The 172.291 grams added to this section give a density of 0.94 gm/cc. The final SiC layer at the bottom has 67.596 grams and a density of 1.39 gm/cc. The details of the section heights, weights, volumes and densities are in the Table below.

Manual methods using hand tools
Steam or high pressure $H_2O$ (heated)
Vibrating table to mechanically dislodge catalyst
Solvents
   d-Limonene
   n-hexane
   Toluene
   n-decane
   n-octane
   Cyclohexane
   10% Daraclean 212
   20% KOH
Dry ultrasound
   Catheters aimed at removing catalyst from individual or small groups of channels—e.g. Ultraform® UF DME Ultrasonic Die Polisher equipped with a modified Sawzall® blade #5184 or metal catheter Physical methods of removal included the use of a 3 and 5 pound steel sledge hammer, aircraft drill bits, a dead blow hammer and a hopper vibrator. Pressurized hot water was also attempted. This was used in lieu of steam which posed a greater safety risk. Recovery of extracted catalyst from a water bath was known to be more cumbersome but this never became an issue since the hot water method only yielded an additional ~20 grams of recovered catalyst.

Bench scale evaluation of the candidate solvents (listed above) using a Soxhlet extractor showed that warm hexane was most effective in dissolving the residual FT waxes and breaking down agglomerated particles. However, the Soxhlet method of continuous flow of warm solvent and subsequent extraction was difficult to accomplish on the device due to its size and design configuration. As an alternative, a fill and soak method was used. Ultimately this proved

|  | Sheryl's measurement Average [inches] | Standard Deviation interval [inches] | Weight of powder in section [grams] | Volume of section [cm³] | Density of powder in section [grams] |
|---|---|---|---|---|---|
| Bottom | 24.055 | — | — | — | — |
| Bottom channel SiC layer's top | 22.295 | — | 67.596 | 48.764 | 1.386 |
| Bottom channel catalyst loading top | 14.330 | 0.514 | 172.2912 | 183.1309 | 0.938 |
| Step | 12.563 | — | 76.516 | 55.577 | 1.377 |
| "Step" SiC layer's top | 11.511 | 0.247 | 141.212 | 145.198 | 0.973 |
| Top channel catalyst loading top | 1.198 | 0.116 | 33.011 | 18.344 | 1.799 |
| Top channel SiC loading top | 0.485 | — | — | — | — |

Table: Catalyst Loading Levels

After 1170 hrs of operation the catalyst was passivated by incremental replacement of $N_2$ with oxygen (air) at 80° C. De-waxing was conducted at 200° C. Upon cool down and removal from the test enclosure, the header and footer were removed. The header and footer foam that was used to retain catalyst within the channels was also removed. The catalyst did not flow out of the channels via a simple gravity induced drain. The catalyst was firmly locked within the channels, apparently through a combination of physical locking, particle to particle adhesion caused by residual wax that was not removed during the de-waxing process and further exacerbated by polymerized pump oil that entered the reactor during one of the operational upsets A variety of methods were investigated to unload the remaining catalyst from the reactor channels. The following methods were unsuccessful for unloading the FT microchannel reactor, but may have efficacy for unloading other particulate catalysts in microchannels.

ineffective because the solvent cooled too quickly after introduction into the reactor body. Furthermore, the hexane solvent never penetrated deep enough into the catalyst bed to break down the wax residue. In the end only 3.7 grams of catalyst was removed using this method.

Electric Discharge Machining was eventually used to cut bulk structure from the reactor body and minimize its weight for easier handling. Specific cuts were also performed to allow easy access to select channels in order to evaluate the strength of the solidified bed, gauge the extent of channel plugging and test the theory of dry sonication on individual channels. To accomplish this the cooling headers were removed from both sides of the reactor body and a planar cut was made to remove the bulk metal from the entire face on one side of the rector leaving only a thin layer of metal that could be peeled back to expose entire channels. An early series of dry sonication tests were performed on several channels by using an Ultraform® UF DME Ultrasonic Die Polisher equipped with a modified Sawzall® blade #5184. As described earlier, the ultrasound was transmitted through the blade and the blade inserted into individual channels to loosen the packed bed. Four exposed channels were cleared with a spatula and the sonic catheter technique was used with partial success to clear a small percentage of material from several others. The combined result was the removal of an additional ~25 grams of catalyst. However, ~200 grams of catalyst still remained tightly locked within the channels.

Eventually 245 grams of the original total loading of 491 grams was removed using a combination of these techniques. They were finally abandoned as legitimate extraction tools especially after it was evident that the additional quantities of material being removed from the reactor were not worth the time, cost and effort to continue.

Early work also focused on mechanically vibrating the entire device to dislodge the catalyst from the channels, similar to the process envisioned for bed densification. However, it was determined that mechanical vibration produced deficient force to unload severely trapped catalyst from some device channels, and unlike ultrasound there is no possibility to focus vibration energy on specific locations.

The primary system used for all unloading experiments was the same for the early loading trials. The position of the ultrasound unit is adjusted pneumatically in the vertical dimension along the length of the steel column allowing the horn to be positioned directly on the top edge of the channels with selectable contact pressure against the surface of the device. The horn was tuned to a frequency of 20 kHz with amplitude 0.5 mm and brought in contact with the device at a pressure of 20-30 psi. Multiple 10-20 second ultrasound bursts over a 5 minute period successfully dislodged the remaining catalyst from the reactor channels. A total of 180 grams was collected using the dry ultrasound technique. Close inspection of the reactor channels revealed all but 3 of the 86 channels were completely clear. It is worth noting that at this point the ultrasonic conditions under which the FT microchannel reactor was tested were not optimized and in fact were very robust. Adjustments were made only to burst duration and the contact pressure of the horn against the device.

Other trial simulations were performed on the model devices to purposely trap powder in the waveform channels and subsequently remove it using dry ultrasound. It was evident that complete densification of the bed upon loading leads to strong mechanical interlocking between particles and the walls of the channels. This results in powder entrapment that cannot be removed easily through gravitational or other forces. In contrast, ultrasound disrupts the sheer and frictional forces within the packed bed and stimulates flow resulting in channels that unload quickly and with minimal effort.

Operational bench scale catalyst testing reactors were also used to evaluate unloading performance. Several of these devices did not undergo the standard de-waxing process at the end of their operating cycle. This allowed product waxes to remain entrained within the channel along with the catalyst powder, essentially simulating a worst case scenario for catalyst entrapment. The transmission of ultrasound, in a dry reactor, successfully removed the material from the device channels.

Ultrasonic Particulate Densification

Ultrasound testing was performed using the following materials:

Formed extrusion supplied by Engelhard Corp. (BASF) and designated A1-4126E. The material was milled and screened to provide a 50×80 mesh particle distribution FT catalyst powder consisting of the above alumina support material and impregnated with 30% cobalt FT catalyst powder consisting of a 50×80 mesh silica support and impregnated with 50% cobalt The powders were densified in channels measuring 19.05 cm and 61 cm long with cross dimensions of 0.3175 cm by 0.1 cm and 0.57 cm×0.1 cm. Particle attrition, segregation of particles across the length of the packed bed and the relationship to ASTM PABD were studied.

The following variables were evaluated to increase loading and densification efficiency with minimal impact to the physical integrity of the catalyst powder:
Ultrasonic frequency
Amplitude of the ultrasonic waves
Pressure of the horn against its contact surface
Location of the horn on the device body
Burst duration (Single or multiple bursts of ultrasound energy transmitted into device)

Through these trials it was determined that the powder bed densified approximately 4% more using ultrasound compared to conventional ASTM tapped or vibratory PABD methods. Physical horn location near the top of the open channels again proved to be an ideal location for settling performance. As described earlier, if the horn is positioned in this manner the waveform channels function as a focusing medium for the ultrasonic energy by transmitting ultrasound vibration through the walls of the channels in a longitudinal direction with little attenuation across their length. Horn contact pressure against the top of the device was evaluated from 25-40 psi. Horn location and pressure are related in their ability to influence load and densification quality. It was shown that poor horn location and/or pressure produced a negative effect whereby the catalyst bed could be sonically vibrated to such an extent that fluidization occurs. In this case air entrapment in the column of catalyst led to voids in the catalyst bed, improper densification and poor fill level uniformity across channels. The horn was typically maintained at a frequency of 20 kHz at amplitude 0.5 mm; it is believed that other ultrasonic wavelengths and frequencies will also work.

Burst duration was evaluated from 3-30 seconds but bursts of only 3-10 seconds proved to be sufficient. In fact, burst duration was the most effective in attaining proper bed densification. The shorter, optimized burst times also had little negative impact on the physical integrity of the material itself.

Burst Duration:

A distinction can be made between burst duration and pulse duration. In this work the sonic energy was applied to the waveform channels in one or more bursts lasting from 1-30 seconds. It is contemplated that a series of very short, "pulses" can be applied to the device over a prescribed period as opposed to steady bursts. It is envisioned that this may provide efficient densification with minimal physical damage to the catalyst.

Proper bed densification can be achieved with burst periods ranging from 1-30 sec., preferably 3-10 sec., and most preferably 3-5 sec. Application of ultrasonic energy >30 sec results in no additional bed settlement Application of ultrasonic energy at 30-90 sec shows minor evidence of bed stratification. Attrition does not appear to be a concern at <30 sec burst duration. Application of ultrasonic energy for periods required to attain loading targets does not significantly segregate the bed into regions composed of different particle sizes. Burst duration without excessive heating or physical degradation of the catalyst is the most influential parameter for controlling the degree of densification and quality of bed settlement.

Packed Apparent Bulk Density (PABD):
  Achieved PABD's from 1-1.8 g/cc depending on catalyst or inert material evaluated
  Can achieve ASTM PABD (tapped/vibration) within 3-5 sec at f=20 kHz
  5-10 sec bursts at 20 kHz achieves max PABD of a 61 cm long bed (in excess of ASTM PABD)
  Beds containing FT type catalysts settle an additional 3-5% using ultrasound vs. ASTM PABD methods Contact Pressure:
  Preferable range of horn contact pressure=200 kPa (30 psi) to 280 kPa (40 psi), more preferably 34-36 psi
    In contrast to smooth and efficient densification, excessive contact pressure and/or poorly controlled horn placement can result in highly undesirable bed fluidization Void Fraction
  Achieved packed bed void fraction from 31-38% depending on material evaluated Ultrasound Using Larger Devices
Reactor without Waveform Insert:

Ultrasonic densification of $Al_2O_3$ catalyst support material was conducted in a different microchannel reactor containing a single channel with dimensions 61 cm long×0.1 cm tall×0.57 cm. The channel was completely filled and the bed pre-densified on a vibration table to the maximum achievable followed by ultrasound densification. Placement of the ultrasound horn was at the top (relative to gravity) end of the channel. Three 10 second ultrasonic bursts were then applied to the top of the device at a frequency of 20 kHz resulting in 2.54 cm of additional settlement. Both the packed apparent bulk density of the alumina and the channel volume were determined earlier so the expected settlement along the 61 cm channel length was easily calculated. In effect, the bed densified to a level nearly equivalent to that measured for the ASTM PABD of the alumina powder. As previously described the source horn should remain in sonic contact with device, preferably at recommended contact pressures. The positive densification results provided strong evidence that the channels (or multiple rows of channels) do not need to be closely spaced between thin separating walls within the reactor body to guarantee proper densification. In fact, the reactor in this example is comprised of a single channel positioned at the center of a relatively heavy reactor body (~6 kgs) with steel walls ~2.3 cm×1.52 cm thick.

What is claimed:

1. A method of increasing packing density of particulates loaded into a plurality of microchannels in microchannel apparatus, comprising:
providing a microchannel apparatus comprising a plurality of microchannels that comprise particulates;
positioning a ultrasound-producing head at one end of the plurality of microchannels and placing the head in sonic contact with the plurality of microchannels; and,
applying ultrasonic energy to the plurality of microchannels from the ultrasound-producing head.

2. The method of claim 1 wherein a sonically conductive solid material is disposed between the ultrasound-producing head and the plurality of microchannels.

3. The method of claim 2 wherein the sonically conductive material has a thickness of 2 mm or less.

4. The method of claim 1 wherein the ultrasonic energy has a frequency of 20 to 40 kHz.

5. The method of claim 4 wherein the ultrasound-producing head is pressed against the apparatus with a contact pressure of 200 kPa (30 psi) to 280 kPa (40 psi).

6. The method of claim 1 wherein the ultrasonic energy is provided in bursts of 30 seconds or less.

7. The method of claim 1 wherein each microchannel in the plurality of microchannels has a length of at least 10 cm and at least one dimension of 2 mm or less.

8. The method of claim 1 wherein the microchannel apparatus comprises at least 1000 microchannels and wherein the ultrasound-producing head extends over no more than 500 of said at least 1000 microchannels.

9. The method of claim 1 wherein the microchannel apparatus comprises channels at least partly defined by walls of a wave-shaped insert; and wherein the insert transmits sonic energy down the length of the microchannel.

10. The method of claim 1 further comprising a step, that is subsequent to the step of applying ultrasonic energy, of attaching a manifold that covers the ends of the plurality of microchannels and creates a flow path for fluid into or out of the plurality of microchannels.

11. The method of claim 1 wherein the ultrasonic energy is provided in bursts of from 1 to 10 seconds.

12. The method of claim 1 wherein the ultrasonic energy is provided in bursts that range from 1 to 3 seconds.

13. The method of claim 1 wherein the ultrasound-producing head is in direct contact with the plurality of microchannels.

14. The method of claim 1 wherein the particulates comprise a catalyst.

15. The method of claim 14 wherein the catalyst comprises cobalt.

16. The method of claim 1 wherein the ultrasound-producing head contacts the apparatus through a solid medium having a thickness of 0.5 cm or less.

17. The method of claim 1 wherein the plurality of microchannels are oriented vertically with respect to gravity.

18. The method of claim 17 wherein the plurality of microchannels have inlets and the ultrasound-producing head is positioned over the inlets of the plurality of microchannels.

19. The method of claim 1 wherein the particulates are a dry powder inside the plurality of microchannels.

20. The method of claim 1 wherein the ultrasound-producing head is touching the plurality of microchannels or is within 0.5 cm of the plurality of microchannels through a solid medium that transmits sound.

* * * * *